United States Patent

[11] 3,619,194

[72] Inventor Gary F. Mitchell
 Rochester, N.Y.
[21] Appl. No. 874,389
[22] Filed Nov. 5, 1969
[45] Patented Nov. 9, 1971
[73] Assignees Gary F. Mitchell
 Rochester, N.Y.;
 Eastman Kodak Company
 Rochester, N.Y.
 Continuation-in-part of application Ser. No. 832,847, June 12, 1969, now abandoned.

[54] NOVEL LIGHT-ABSORBING LAYERS FOR PHOTOGRAPHIC ELEMENTS CONTAINING SUBSTITUTED 1-AMINOPYRIDINIUM DYES
 25 Claims, No Drawings

[52] U.S. Cl.................................................. 96/84, 96/27, 96/89, 96/99
[51] Int. Cl................................................... G03c 1/84
[50] Field of Search..................................... 96/84, 89, 99, 27

[56] References Cited
UNITED STATES PATENTS
3,365,293  1/1968  Haefeli et al.................  96/84

Primary Examiner—Norman G. Torchin
Assistant Examiner—Edward C. Kimlin
Attorneys—William H. J. Kline, James R. Frederick and Fred L. Denson ABSTRACT: Novel light-absorbing photographic layers containing substituted l-aminopyridinium dyes are described. These layers are useful as filter and antihalation layers in photographic elements.

NOVEL LIGHT-ABSORBING LAYERS FOR PHOTOGRAPHIC ELEMENTS CONTAINING SUBSTITUTED 1-AMINOPYRIDINIUM DYES

This application is a continuation-in-part of Ser. No. 832,847, now abandoned, filed June 12, 1969 by Gary F. Mitchell.

This invention relates to light absorbing photographic layers, and particularly to filter and antihalation layers for photographic elements.

In the preparation of sensitive photographic elements, it is frequently desirable to incorporate one or more layers of colloidal material containing dyes or other coloring material. These layers may fulfill any number of purposes, such as the reduction of halation or filtration of certain undesirable rays from the exposing radiation, either upon direct exposure or for reexposure in a photographic reversal process. Antihalation layers may be coated as a backing layer on a transparent support carrying a light-sensitive layer or layers, or may be coated between the light-sensitive layer and the support. Light filtering layers may be coated over the light-sensitive emulsion layers or between such layers in multilayer elements.

The dyes used for such a layer must have the desired spectral absorption characteristics. In conventional prior art elements, they are easily incorporated in a water-permeable hydrophilic colloidal layer and firmly held in that layer so that they do not diffuse from it during the manufacture of the element or upon storing. It is generally desirable to employ light-filtering dyes which can be quickly and readily rendered ineffective, i.e., decolorized or destroyed and removed prior to or during or after photographic processing. For many purposes it has been found to be particularly convenient to employ dyes which are rendered ineffective by one of the photographic baths used in processing the exposed element, such as a photographic developer or fixer. The decoloration or destruction of a light-absorbing dye will hereinafter be referred to as bleaching.

Prior art dyes having desirable absorption characteristics have not always had good bleaching characteristics and visible images made from photographic elements containing them have been subject to undesirable stains. Other dyes have not had the desired stability which is required for normal storage of the photographic element. Many dry photographic processes, that is, those photographic processes which require no liquids for the preparation of a visible image, have employed light-absorbing dyes which could only be removed by subjecting them to some form of liquid treatment for example, an acid bath or an alkaline bath solution. Thus, many of these dry processes have lost their attractiveness since liquids are required for the dye removal. Typical processes employing prior art light-absorbing layers are described in U.S. Pat. 3,260,601 and U.S. Pat. 3,282,699.

It is an object of this invention to provide novel light-absorbing layers for use in photographic elements.

It is another object of this invention to provide photographic elements containing these novel light-absorbing layers.

It is a further object of this invention to provide photographic elements having novel light-absorbing layers which are bleachable by heat or light.

It is yet another object of this invention to provide a process for using photographic elements containing novel light-absorbing layers.

These and other objects of the invention are accomplished with light-absorbing photographic layers containing a dye having one of the following formulas $$\begin{array}{c} \phantom{xx} \cdots Z \cdots \\ +N=CH-CH \Big)_{p-1}=C-R_3 \\ | \\ N \\ / \ \backslash \\ R_1 \ \ R_2 \end{array} \quad X^- \quad \text{and} \quad \begin{array}{c} \phantom{xx} \cdots Z \cdots \\ N-\Big(CH=CH\Big)_{p-1}-C=R_4 \\ | \\ N \\ / \ \backslash \\ R_1 \ \ R_2 \end{array}$$

(I)           (II)

wherein:

$R_1$ and $R_2$ can be either a. an alkyl group preferably having one to eight carbon atoms such as methyl, ethyl, propyl, butyl, etc. including a substituted alkyl radical such as aralkyl, e.g., benzyl; hydroxyalkyl such as hydroxypropyl, hydroxyethyl; etc., b. an acyl group, e.g., $$-\overset{O}{\underset{\|}{C}}-R_5$$

including a thiaacyl group, e.g., $$-\overset{S}{\underset{\|}{C}}-R_5$$

wherein $R_5$ is an alkyl group preferably having one to eight carbon atoms such as methyl, ethyl, propyl, butyl, etc., an aryl group such as phenyl, naphthyl, tolyl, etc., an alkoxy group containing one to eight carbon atoms such as methoxy, ethoxy, butoxy, isobutoxy, etc., an amino group such as arylamino, alkylamino, etc., a heterocyclic nucleus containing five to six members at least one of which is oxygen, sulfur or nitrogen such as a pyridine nucleus, a quinoline nucleus, etc.;

c. hydrogen;

d. an aryl radical including a substituted aryl radical, e.g., phenyl, naphthyl, tolyl, hydroxyphenyl, halophenyl such as chlorophenyl, 2,4,6-trichlorophenyl, nitrophenyl, carboxyphenyl, alkoxyphenyl such as methoxyphenyl, ethoxyphenyl, etc., e. a heterocyclic nucleus containing five to six members in the nucleus at least one member being a nitrogen sulfur, selenium or oxygen atom including a substituted heterocyclic nucleus such as a pyridine nucleus, a quinoline nucleus, a benzothiazole nucleus, etc.;

f joined together to complete a five to six membered heterocyclic nucleus including a substituted heterocyclic nucleus such as a 4H-1,2,4-triazolyl, an alkyl substituted 4H-1,2,4-triazolyl, an aryl substituted 4H-1,2,4-triazolyl, a morpholino group, an imidazole group, a piperidino group, a pyrrole group, a pyrrolidino group, etc.;

$p$ is a positive integer from one to two;

$R_3$ can be a methine linkage terminated at a heterocyclic nucleus of the type contained in cyanine dyes, e.g., those set forth in Mees and James, The Theory of the Photographic Process, MacMillan, 3rd ed. pp. 198–232;

$R_4$ can be a methine linkage terminated by a heterocyclic nucleus of the type contained in merocyanine dyes, e.g., those set forth in Mees and James (cited above);

$X^1$ can be an acid anion, e.g., chloride, bromide, iodide, perchlorate, sulfamate, thiocyanate, p-toluenesulfonate methyl sulfate, tetrafluoroborate, etc.; and $Z$ represents the atoms necessary to complete a five to six membered heterocyclic nucleus including a substituted heterocyclic nucleus which nucleus can contain at least one additional hetero atom such as oxygen, sulfur, selenium or nitrogen, e.g., a pyridine nucleus, an indole nucleus, a quinoline nucleus, etc.

The preferred light-absorbing photographic layers of this invention contain 1-aminopyridinium dyes having one of the following structures:

$$\begin{array}{c} R_8 \\ | \\ R_7-\overset{\phantom{x}}{\underset{+N}{\bigcirc}}\Big(L=L\Big)_{n-1}L=C-\Big(CH=CH\Big)_{\epsilon-1} \overset{Q_1}{N}-R_6 \\ | \\ N \\ / \ \backslash \\ R_1 \ \ R_2 \end{array} \quad X^-$$

(III)

$$\begin{array}{c} R_8 \\ | \\ R_7-\overset{\phantom{x}}{\underset{+N}{\bigcirc}}\Big(L-L\Big)_{m}\overset{Q_2}{=}C-C=O \\ | \\ N \\ / \ \backslash \\ R_1 \ \ R_2 \end{array}$$

(IV)

wherein $Q_1$ represents the nonmetallic atoms necessary to complete a heterocyclic nucleus containing five or six atoms in the heterocyclic ring, which nucleus can contain at least one additional hetero atom such as oxygen, sulfur, selenium or nitrogen, i.e., a nucleus of the type used in the production of cyanine dyes, such as the following representative nuclei: a thiazole nucleus, e.g., thiazole, 4-methylthiazole, 3-ethylthiazole, 4-phenylthiazole, 5-methylthiazole, 5-phenylthiazole, 4,5-dimethylthiazole, 4,5-diphenylthiazole, 4-(2-thienyl)-thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 6-nitrobenzothiazole, 5-bromobenzothiazole, 6-bromobenzothiazole, 5-chloro-6-nitrobenzothiazole, 4-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, a tetrahydrobenzothiazole nucleus, 5,6-dimethoxybenzothiazole, 5,6-methylenedioxybenzothiazole, 5-hydroxybenzothiazole, 6-hydroxybenzothiazole, α-naphthothiazole, β-naphthothiazole, β,β-naphthothiazole, 5-methoxy-β,β-naphthothiazole, 5-ethoxy-β-naphthothiazole, 8-methoxy-α-naphthothiazole, 7-methoxy-α-naphthothiazole, 4'-methoxythianaphtheno-7',6 ',4,5-thiazole, nitro group substituted naphthothiazoles, etc.; an oxazole nucleus, e.g., 4-methyloxazole, 4-nitro-oxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, α-naphthoxazole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorobenzoselenazole, 5-methoxybenzoselenazole, 5-hydroxybenzoselenazole, 5- or 6-nitrobenzoselenazole, 5-chloro-6-nitrobenzoselenazole, tetrahydrobenzoselenazole, α-naphthoselenazole, β-naphthoselenazole, nitro group substituted naphthoselenazoles, etc.; an oxazoline nucleus, e.g., 4,4-dimethyloxazoline, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 6-methyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, typically having a nitro or cyano substituent, e.g., 3,3-dimethyl-5 or 6-nitroindolenine, 3,3-dimethyl-5 or 6-cyanoindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-alkyl-5-nitrobenzimidazole, 1-aryl-5,6-dichlorobenzimidazole, 1-alkyl-α-naphthimidazole, 1-aryl-β-naphthimidazole, 1-alkyl-5-methoxy-α-naphthimidazole, or, an imidazo[4,5-b]quinoxaline nucleus, e.g., 1-alkylimidazo[4,5-b]quinoxaline such as 1-ethylimidazo[4,5-b]quinoxaline, 6-chloro-1-ethylimidazo[4,5-b]quinoxaline, etc., 1-alkenylimidazo[4,5-b]quinoxaline such as 1-allylimidazo[4,5-b]quinoxaline, 6-chloro-1-allylimidazo[4,5-b]quinoxaline, etc., 1-arylimidazo[4,5-b]quinoxaline such as 1-phenylimidazo[4,5-b]quinoxaline, 6-chloro-1-phenylimidazo[4,5-b]quinoxaline, etc.; a 3,3-dialkyl-3H-pyrrolo[2,3-b]3,3-dimethyl-3H-pyrrolo[2,3-b]pyridine, 3,3-diethyl-3H-pyrrolo[2,3-b]pyridine, etc.; a thiazolo[4,5chb]quinoline nucleus; an indolyl nucleus including substituted indolyl nuclei such as a 2-phenyl-3-indole, 1-methyl-2-phenyl-3-indole; and the like;

$Q_2$ represents the nonmetallic atoms required to complete a five to six membered heterocyclic nucleus, typically containing a hetero atom selected from nitrogen, sulfur, selenium, and oxygen, such as a 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.); an isoxazolone nucleus (e.g., 3-phenyl-5-(4H)-isoxazolone, 3-methyl-5-(4H)-isoxazolone, 3-methyl-5-(4H)-isoxazolone, etc.); an oxindole nucleus (e.g., 1-alkyl-2,3-dihydro-2-oxindoles, etc.), a 2,4,6-triketohexahydropyrimidine nucleus (e.g., barbituric acid or 2-thiobarbituric acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di-β-methoxyethyl), etc.) or 1,3-diaryl e.g., 1,3-diphenyl, 1,3-di(p-chlorophenyl), 1,3-di(p-ethoxycarbonylphenyl), etc. or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives), a rhodanine nucleus (i.e., 2-thio-2,4-thiazolidinedione series), such as rhodanine, 3-alkylrhodanines (e.g., 3-ethylrhodanine, 3-allylrhodanine, etc.), 3-carboxyalkylrhodanines (e.g., 3-(2-carboxyethyl)rhodanine, 3-(4-carboxybutyl)rhodanine, etc.), 3-sulfoalkylrhodanines (e.g., 3-(2-sulfoethyl)rhodanine, 3-(3-sulfopropyl)rhodanine, 3(4-sulfobutyl)rhodanine, etc.), or 3-arylrhodanines (e.g., 3-phenylrhodanine, etc.), etc.; a 2(3H)-imidazo[1,2-a]pyridone nucleus; a 2-furanone nucleus (e.g., 3-cyano-4-phenyl-2(5H)-furanone); a thiophen-3-one-1,1-dioxide nucleus (e.g., benzo /b/ thiophen-3(2cH)-one-1,1-dioxide); a 5,7-dioxo-6,7-dihydro-5-thiazolo[3,2cha]-pyrimidine nucleus (e.g., 5,7-dioxo-3-phenyl-6,7-dihydro-5-thiazolo[3,2-a]pyrimidine, etc.); a pyrrolo[1,2-]pyrimidine-2,4(3H)-dione nucleus; a 2-thio-2,4-oxazolidinedione nucleus (i.e., those of the 2-thio-2,4(3H,5H)-oxazoledione series) (e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3-(3-carboxypropyl)-2-thio-2,4-oxazolidinedione, etc.); a thianaphthenone nucleus (e.g., 2-(2H)-thianaphthenone, etc.); a 2-thio-2,5-thiazolidinedione nucleus (i.e., the 2-thio-2,5(3H,4H)-thiazoledione series) (e.g., 3-ethyl-2-thio-2,5-thiazolidinedione, etc.); a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.); a thiazolidinone nucleus (e.g., 4-thiazolidinone, 3-ethyl-4-thiazolidinone, 3-phenyl-4-thiazolidinone, 3-α-naphthyl-4-thiazolidinone, etc.); a 2-thiazolin-4-one series (e.g., 2-ethylmercapto-2-thiazolin-4-one, 2-alkylphenylamino-2-thiazolin-4-one, 2-diphenylamino-2-thiazolin-4-one, etc.); a 2-imino-4-oxazolidinone (i.e., pseudohydantoin) nucleus; a 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-2-α-naphthyl-2,4-imidazolidinedione, 1,3-diphenyl-2,4-imidazolidinedione, etc.); a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4- imidazolidinedione, 1-ethyl-3-α-naphthyl-2-thio-2,4-imidazolidinedione, 1,3-diphenyl-2-thio-2,4-imidazolidinedione, etc.); a 2-imidazolin-5-one nucleus (e.g., 2-propylthio-2-imidazolin-5-one, etc.);

$R_6$ represents an alkyl group including substituted alkyl (preferably a lower alkyl containing from one to four carbon atoms), e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., an amino or substituted amino group, e.g., dimethylamino, diethylamino, etc., a sulfoalkyl group, e.g. β-sulfoethyl, α-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc. or an aralkyl group, e.g., benzyl, phenethyl, etc.; an alkenyl group, e.g., allyl, 1-propenyl, 2-butenyl, etc., or an aryl group, e.g., phenyl, tolyl, naphthyl, methoxyphenyl, chlorophenyl, etc.;

$n$ is a positive integer from one to three;

$m$ is a positive integer from one to two;

$g$ is a positive integer from one to two;

L represents a methine linkage having the formula

wherein T can be hydrogen, lower alkyl of one to four carbon atoms or aryl such as phenyl, e.g., $-CH=$, $-C(CH_3)=$, $-C(C_6H_5)=$, etc.;

$R_7$ and $R_8$ each can be 1 a hydrogen atom, 2 an alkyl group (preferably a lower alkyl containing from one to four carbon atoms) including a substituted alkyl group such as aralkyl, hydroxyalkyl, e.g., methyl, ethyl, propyl, isopropyl, butyl, tert-butyl, dodecyl, benzyl, hydroxypropyl, hydroxyethyl, etc. or 3 an aryl group including a substituted aryl group such as an alkaryl, haloaryl, alkoxyaryl, aminoaryl, etc. e.g., phenyl, tolyl, naphthyl, methoxyphenyl, chlorophenyl, diethylaminophenyl, etc.;

$X^1$, $R_1$ and $R_2$ are the same as defined above.

The novel light-absorbing layers of this invention containing those dyes described above have several advantages over elements containing other types of light-absorbing layers. One of the primary advantages is that these layers are irreversibly bleached upon exposure to light of adequate intensity. Because of this advantage, these layers can be used in photographic elements which are developed by dry processing. A typical dry process in which these layers are useful is the light development process disclosed in Colt, U.S. Pat. No. 3,418,122. In such a photodevelopment application, the silver halide coating is imagewise exposed to form a latent image, the exposed coating heated to at least about 300° F., and, after heating, the coating is uniformly exposed to light for a time sufficient to produce a visible image. The heating step in such a photodevelopment process represses the usual printing out of unexposed or nonimage areas (Dmin), the original recording sensitivity of the silver halide being inactivated by such heating. Images thus prepared have a high degree of permanence or stability to ambient light. The silver halide compositions which are useful in the emulsions coated on these elements comprise silver halide grains having polyvalent metal ions or atoms occluded therein. The silver halide grains having occluded polyvalent metal ions therein are generally obtained by precipitating in the presence of the polyvalent metal ions and preferably in an acid medium. Typical emulsions of this type are disclosed in French Pat. 1,456,581 made available Oct. 28, 1966 and in Bacon, U.S. Ser. No. 629,090 filed Apr. 7, 1967. In one embodiment the emulsion contains silver halide grains with trivalent metal ions occluded therein. In such an embodiment, it is preferable to have contiguous to the trivalent metal-containing silver halide grains a halogen acceptor.

A wide variety of halogen acceptors can be utilized in the silver halide systems. Such materials are well known to those skilled in the photographic art and are conventionally added to light-developable, direct print silver halide emulsions.

Nitrogen-containing halogen acceptors are particularly useful in preparing the silver halide systems processed in accordance with the invention. Suitable nitrogen-containing halogen acceptors used can be represented by the formulas,

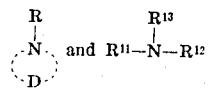

wherein; R, R and R can each be hydrogen atoms, alkyl radicals, aryl radicals, including substituted alkyl and aryl radicals, or acyl radicals (e.g.,

wherein $R^{14}$ is a hydrogen atom, an alkyl radical or an aryl radical); can be a nitrogen-containing radical such as an amino radical or a thiocarbamyl radical, including substituted amino and thiocarbamyl radicals; and D represents the necessary atoms to complete a heterocyclic nucleus generally having five or six atoms including at least two nitrogen atoms and at least one divalent radical having the formula,

wherein X can be a sulfur atom, an oxygen atom, a selenium atom or an imino radical ($=NH$). When a nitrogen atom comprising D or $R^{12}$ is attached directly to the nitrogen atoms of the above formulas, at least one hydrogen atom is attached to at least one of such nitrogen atoms of the halogen acceptor. The amino radical for substituent $R^{12}$ can be represented by the formula,

wherein $R^{15}$ and $R^{16}$ can each typically be such substituents as hydrogen atoms, alkyl radicals, aryl radicals or acyl radicals as described above for $R^{11}$ and $R^{13}$. The thiocarbamyl radical for substituent R can be represented by the formula,

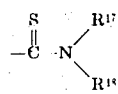

wherein $R^{17}$ and $R^{18}$ can be the same substituents as $R^{15}$ and $R^{16}$ or amino radicals.

Particularly useful nitrogen-containing halogen acceptors can be further represented by the following subgeneric formulas:

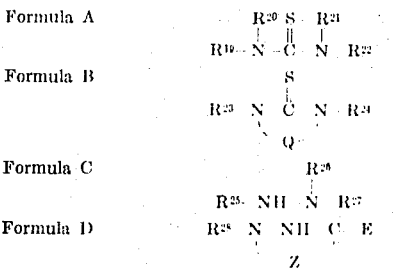

wherein: $R^{19}$, $R^{20}$, $R^{21}$, $R^{22}$, $R^{23}$, $R^{24}$, $R^{25}$, $R^{26}$, $R^{27}$ and $R^{28}$ can each be hydrogen atoms, alkyl radicals, aryl radicals or acyl radicals as described above for R, $R^{11}$ and $R^{13}$; E can be a sulfur atom, an oxygen atom, a selenium atom or an imino radical; and Q and Z can be the necessary atoms to complete a heterocyclic nucleus generally having five or six members. Q and Z typically are the necessary atoms to complete such moieties as a triazole-thiol, a mercaptoimidazole, an imidazolidine-thione, a triazinethiol, a thiobarbituric acid, a thiouracil, a urazole including a thiourazole and the like heterocyclic moieties.

With respect to the above formulas of nitrogen-containing halogen acceptors: the aryl radical substituents are those of the naphthyl and phenyl series, and include such common substituents as alkyl groups, halogen atoms, acyl radicals and the like; the alkyl radical substituents typically can contain one to 20 carbon atoms and more generally one to eight carbon atoms, and can be substituted with such radicals as aryl radicals, halogen atoms, acyl radicals and the like.

Typical halogen acceptors of the thiourea type represented by Formula A and Formula B are disclosed in copending Kitze application, now U.S. Pat. No. 3,241,971 issued Mar. 22, 1966; and in copending Fix application, now U.S. Pat. No. 3,326,689. Typical halogen acceptors of the hydrazine type represented by Formula C are disclosed in Ives, U.S. Pat. No. 2,588,982, issued Mar. 11, 1952. Typical halogen acceptors of the type represented by Formula D are the urazole and thiourazole halogen acceptors disclosed in Bacon and Illingsworth application, U.S. Ser. No. 406,186filed Oct. 23, 1964, now Pat. No. 3,396,017.

Other typical halogen acceptors that can be used include stannous salts such as stannous chloride as disclosed in Hunt, U.S. Pat. No. 3,033,678 issued May 8, 1962; aromatic mercaptans such as thiosalicylic acid; hydroquinones such as hydroquinone, chlorohydroquinone, gentistic acid and t-butylhydroquinone; catechols such as phenyl catechol and t-butylcatechol; p-aminophenols such as N-methyl-p-aminophenol sulfate; 3-pyrazolidones such as 1-phenyl-3-pyrazolidone, 4-methyl-1-phenyl-3-pyrazolidone and 1-phenyl-4,4-dimethyl-3-pyrazolidone; phenylenediamines; nitriles; phenols; glycine; sodium sulfite; alkaline materials such as borax, alkali metal hydroxide, etc.; and the like halogen acceptors well known to those skilled in the art.

Another dry copy process, as described in U.S. Pat. No. 3,453,075, utilizes a photosensitive copy-sheet product having a normally substantially latent coating which is capable of undergoing permanent visible change at light-struck areas on being briefly heated at moderately elevated temperatures. The sensitive layer contains a light-stable organic silver salt oxidizing agent, an organic reducing agent, and photosensitive silver halide, and has a high level of heat-sensitivity throughout the image areas after exposure to a light image. As a result, there is provided a light-sensitive coating having photographic capability. Visible images of photographic sharpness and of high visual contrast are produced within seconds by the simple process of exposing the sensitive sheet to a light image and then heating to within a temperature range of 90° C. to 200° C. and preferably 140° C. to 170° C. for 1 to 15 seconds.

The organic silver salt need not be completely insensitive toward light, but should at least be resistant to darkening under indoor illumination to an extent sufficient to prevent destruction or deterioration of copies during several days or weeks or desk-top storage, and may be almost totally resistant to visible change even under diffuse sunlight. A preferred class of salts having excellent stability under exposure to light is represented by the water-insoluble silver soaps of long chain fatty acids which are highly stable to light in the presence of moisture, such for example as silver behenate and silver stearate. The soaps are conveniently prepared by precipitation with silver nitrate solution from aqueous solutions of the alkali metal soaps of corresponding fatty acids, with or without coprecipitation of the fatty acid in any desired proportion. For transparent coatings the fatty acid content is restricted or omitted.

Heat sensitive sheet materials based on organic silver salt oxidizing agents and organic reducing agents are described in Owen U.S. Pat. No. 2,910,377, wherein are included silver behenate and silver stearate as well as the silver salts of a number of other organic acids, viz oleic, lauric, hydroxystearic, acetic, phthalic, terephthalic, butyric, m-nitrobenzoic, salicylic, phenylacetic, pyromellitic, p-phenylbenzoic, undecylenic, camphoric, furoic, acetamidobenzoic, and o-aminobenzoic. Other organic silver salts capable of providing similar effects include the silver salts of saccharin, benzotriazole, phthalazinone, 4'-n-octadecyloxydiphenyl-4-carboxylic acid, 10,12,14-octadecatrienoic acid, and benzoic acid. The silver salts of those organic acids which are water-insoluble and normally solid are preferred, since the byproducts do not adversely affect the coating.

The halide ion of the photosensitive silver halide may be supplied in any of a number of ways. One convenient procedure involves briefly exposing the surface of the organic silver salt particle or coating to the vapors of one or more halogen acids, the extent of the reaction being controlled by controlling both the concentration of the vapor and the time of exposure to the vapor. A preferred procedure involves the coating of any of various halogen-containing liquid solutions of known small concentration and in controlled amounts over the surface of a thin coating of the organic silver salt on a suitable substrate, followed by removal of the solvent if desired, whereby silver halide is formed in situ throughout the surface of the coating of the organic silver salt or the like.

The solution method of applying the halide ion is particularly useful in the preparation of light-sensitive heat-developable copy-sheet materials. It permits the efficient application of the reducing agent and of intensifying or spectral sensitizing dyes or other components simultaneously with the halide ion. The materials are deposited at the exposed surface of the organic silver salt layer where they perform most effectively in subsequent image-forming operations. In some instances the dye employed in spectrally sensitizing or otherwise modifying the sheet may itself serve as the source of a portion of the halide ion, and particularly effective results in terms of increased sensitivity to light have been attained in this manner.

The silver halide may be formed on the silver behenate or other organic silver salt prior to coating the latter on the paper or other carrier surface. An an example, halogen acid (e.g., HCl or HBr) or other source of halide ion is mixed with the organic silver salt under conditions permitting reaction therebetween, e.g., in suspension in a volatile liquid medium.

Hydrogen chloride and hydrogen bromide are effective sources of halide ion. Various water-soluble inorganic halides are somewhat more easily handled and are equally effective; ammonium bromide has been found particularly useful since the ammonium ion is subsequently readily removable, but halides of various metals, e.g., sodium, calcium, magnesium, cobalt and zinc, are also effective. Ionizable organic halogen compounds are also useful examples being triphenylmethyl chloride, triphenylmethyl bromide, 2-bromo-2-methylpropane, 2-bromobutyric acid, 2-bromoethanol, and benzophenone dichloride.

Mild organic reducing agents are included with the organic silver salt material. An outstandingly useful example is hydroquinone. Methylhydroxynaphthalene, methyl gallate, catechol, phenylene diamine, p-aminophenol, phenols including bisphenols and 3-pyrazolidones are other examples of mild reducing agents which have been found useful in the practice of the invention. Since stability of such systems is improved under acidic conditions, it is found desirable to incorporate small proportions of acidic stabilizer materials. Succinic acid is a preferred example. Benzoic acid and salicyclic acid are also useful.

Spectrally sensitizing dyes are well known in the photographic industry for increasing the sensitivity of the silver halide photographic emulsion to visible light of various wavelengths. The same dyes provide similar effects in the practice of the present invention. One such dye is "Phosphine R," Color Index Basic Orange 14. Another is "Dynacolor R-81" merocyanine sensitizing dye, which is 3-allyl-5-[3-ethyl-(2-naphthoxazolylidene)ethylidene]-1-phenyl-2-thiohydrantoin. Other useful merocyanine dyes are 3-ethyl-5-(1-methyl-2(1-3-ethyl-5-(3,4-dimethyl-2-(3-H)-thiazolylidene)rhodanine. Also useful as spectral sensitizers for the purposes of the invention are styryl dyes such as 2-p-dimethylaminostyryl-1-ethylpyridinium iodide, 3-ethyl-5-[(3-ethyl-2(3H)-benzothiazolylidene)-isopropylidene]-2-thio-2,4-oxazolidinedione, and cyanine dyes such as dicyanine, kryptocyanine and allocyanine. The dye may be omitted, particularly where exposure to ultraviolet radiation is contemplated, but dye sensitization is generally desirable in copying with radiant energy in the range of visible light.

U.S. Pat. No. 3,392,020 describes a dry copy process which uses a sensitive element which comprises a photosensitive image-forming component such as silver halide that will develop an infrared-absorbing metal image by imagewise reduction during or after photoexposure. The photographic image development may be spontaneous as in photographic printout materials or may be developed by further processing after exposure. Sensitive elements also contain a heat-sensitive image-forming reactant, separate and distinct from the photosensitive components. This reactant undergoes a visible color change when heated above a certain minimum temperature, usually at a temperature well above 50° C.

Heat-sensitive reactants that undergo immediate color change usually will comprise a mixture of two components, one of which melts at a temperature within the range of about 55–125° C. and reacts with a second component to cause a color change. Miller U.S. Pat. Nos. 2,663,653–7, patented Dec. 22, 1953, describe heat-sensitive materials which comprise a heavy metal salt of a high molecular weight fatty acid in combination with a phenolic material. The materials described in these patents are normally solid reactive materials, of which at least one component is an electron donor and another component is an electron acceptor in contiguity with the donor. These components react in direct ion-exchange (electron-acceptor-donor reaction at room temperature when these components are mixed in a mutual solvent which permits ionization). The reaction is immediate and forms a stable, visibly distinct, highly polarized compound which is less dissociable than the reactive components.

U.S. Pat. No. 2,637,657 patented May 5, 1953, to Ozais describes a heat-sensitive, image-forming material comprising lead formate and mercuric oxalate.

U.S. Pat. No. 2,813,042 patented Nov. 12, 1957 to Gordon et al. describes another useful heat-sensitive material. This material comprises mixed thiourea and a salt of a polyvalent material such as nickel acetate.

Morrison U.S. Pat. No. 2,681,277 patented July 15, 1954, describes still another useful heat-sensitive material.

Other heat-sensitive materials which do not depend upon ionization reactions are described in U.S. Pat. No. 2,899,334 patented Mar. 1, 1959 to Crevling et al. This patent describes a nonionizable quinone such as p-quinone, with a dihydroxy benzene. The patent also describes substituted derivatives of p-quinones and dihydroxy benzenes as useful components.

Among the useful photosensitive metal salts is silver halide which may be used in a variety of photographic silver halide emulsion compositions. In addition, the emulsion coating may contain an incorporated photographic developer, such as that described in U.S. Pat. No. 2,716,059 issued Aug. 23, 1955, to the present inventors. A separate coating may be included, contiguous to the emulsion layer, containing silver halide processing ingredients including photographic developer. In other embodiments photographic metal salt emulsions may be used that produce direct metal image printout when the emulsion is sufficiently exposed to actinic radiation.

The photosensitive metal salt component can be dispersed in any suitable film-forming binder such as the conventional vehicles, e.g., gelatin, albumen, polyvinyl alcohol, hydrolyzed cellulose ester, agar-agar, gum arabic, and the like. The advantage of an incorporated developer in or contiguous to the silver halide emulsion layer is that a silver image can be produced in the coating without need for an external developer, e.g., by exposing the duplicating sheet to uniform elevated temperature (below activation temperature of the heat-sensitive component) or to moist ammonia vapors. While only a low density silver image might be obtained by such treatment, such an image can be subsequently intensified to suitable image density by thermographic development as described herein to produce a corresponding colored image in the layer containing a heat sensitive color-forming reactant.

Other dry processing systems are described in U.S. Pat. No. 3,152,904; U.S. Pat. No. 3,312,550 and U.S. Pat. No. 3,287,137.

Another advantage resulting from the use of these novel light-absorbing layers is that moderately intense light is required for substantial bleaching thus permitting nondestructive exposure at low light levels. Different bleaching rates are obtained with the various dyes falling within the general formula set forth above for a light source of given intensity. These different bleaching rates permit desired variations in the susceptibility to light energy. Additionally, these dyes can be handled in room light for short periods of time without substantial destruction thus permitting their incorporation into elements with a minimum of special precautions.

An additional advantage in using these novel light-absorbing layers is that the dyes contained therein are bleachable in dry coatings. The dyes contained in the novel light-absorbing layers are bleachable in acidic or basic media.

Another advantage resides in the fact that generally these dyes have good incubation stability, allowing their incorporation into elements requiring prolonged storage. Finally, the dyes contained in the novel layers of this invention are irreversibly bleached upon exposure to various other forms of energy besides light including electromagnetic energy such as ultraviolet, X-radiation, laser beams, electron beams, etc. as well as heat. The amount of heat required to cause bleaching of the layers is somewhat dependent upon the particular dye incorporated in the layer; higher temperatures require shorter times to bring about bleaching while lower temperatures require longer times. Generally, temperatures of at least 150° C. for a period of at least 10 seconds are required to bring about any noticeable bleaching. Temperatures of 200° C. and above and times in excess of 20 seconds are generally preferred.

The dyes incorporated in the novel layers of this invention are characterized by their good spectral absorption properties. The maximum absorption of the various individual dyes ranges throughout the visible regions of the spectrum. Also, the dyes are further characterized by the fact that they are readily incorporated in hydrophilic layers used in photographic elements. The dyes are soluble in most of the common organic solvents including halogenated aliphatic hydrocarbons such as chloroform, ketones such as acetone, aliphatic alcohols such as methanol, ethanol, etc., amides such as dimethylformamide, nitrogen-containing heterocyclic solvents such as pyridine, etc. The dyes may also be mordanted with basic mordants where desired. Because of their moderate stability to light and heat, normal exposure light does not cause the dyes to substantially bleach; therefore, during the exposure period the dyes are very efficient. It is only the subsequent application of heat or light of increased intensity or other forms of energy which causes the bleaching to occur.

The dyes described herein are valuable for use in photographic light-sensitive material employing one or more sensitive silver halide layers. The dyes can be used to make light-absorbing layers including antihalation as well as filter layers with or without dyes of other classes and can be incorporated readily in colloidal binders used for forming such layers. They are especially useful in gelatin layers lying adjacent to silver halide layers, since they can be mordanted with organic polymeric substances having excellent nonwandering characteristics in gelatin. The dyes can also be readily bleached without removing the layers containing them. Furthermore, they can be mordanted in layers coated in contact with light-sensitive silver halide emulsion layers since the mordanted dyes have very good stability at the pH of the most sensitive silver halide emulsions and have little or no undesirable effect on the silver halide itself. As a result, the dyes can be used as light-absorbing dyes in layers coated directly on top of the sensitive silver halide emulsion layers or between two sensitive silver halide emulsion layers or between the support and a sensitive silver halide emulsion layers or between the support and a sensitive silver halide emulsion layer or on the back of a support as an antihalation layer.

The light-absorbing layers of this invention can be prepared by coating on the photographic element or on the support the dye itself or a solution of the dye in a suitable solvent. The dyes are preferably mixed with a hydrophilic colloid binder in a solution together with a coating aid such as a saponin. In addition to these materials, it is advantageous to add a basic or acid mordant to the solution to render the dye nonwandering. For most purposes it is desirable to add agents to harden the colloidal binder material so that the light-absorbing layer will remain intact in a photographic element during and following the processing operation. The pH of the coating solution is adjusted when necessary to a level that is compatible with a light-sensitive emulsion by the usual methods.

The proportions of dye, colloidal binder, mordant, hardener, and coating aid used in making the light-absorbing layers may be varied over wide ranges and will depend upon the specific requirements of the photographic element being produced. The methods used to determine the optimum composition are well known to those skilled in the art. Generally, the amount of dye used in the coated light-absorbing layers ranges from about 1 mg./ft.$^2$ to about 30 mg./ft.$^2$. The preferred range is from about 1 to 10 mg./ft.$^2$.

Photographic elements useful in this invention can have silver halide emulsion layers or other layers which contain conventional addenda such as gelatin plasticizers, coating aids, antifoggants such as the azaindenes and hardeners such as aldehyde hardeners, e.g., formaldehyde, mucochloric acid, glutaraldehyde bis(sodium bisulfite), maleic dialdehyde, aziridines, dioxane derivatives, oxypolysaccharides, and vinyl sulfonyl ethers. Sensitizing dyes useful in sensitizing such emulsions are described, for example, in U.S. Pat. No. 2,526,632 of Brooker and White issued Oct. 24, 1950, and U.S. Pat. No. 2,503,776 of Sprague issued Apr. 11, 1950. Spectral sensitizers which can be used are the cyanines, merocyanines, complex (trinuclear) cyanines, complex (trinuclear) merocyanines, styryls, and hemicyanines. Developing agents can also be incorporated into the silver halide emulsion if desired or can be contained in a separate underlayer.

The layers of the photographic elements which are useful in the instant invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Pat. Nos. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates and the like.

The dyes are generally added to the colloidal binder in solution. Usually, a coating aid, such as saponin, is added to the dyed colloidal suspension before coating it as a layer on the photographic element. The dyes are advantageously mordanted with a suitable basic mordant added to the colloidal suspension before coating.

Basic mordants that can be used include the basic mordants described by Minsk in U.S. Pat. No. 2,882,156, issued Apr. 14, 1959, prepared by condensing a polyvinyl-oxo-compound such as a polyacrolein, a poly-methylacrolein, a polyvinyl alkyl ketone, such as polyvinyl methyl ketone, polyvinyl ethyl ketone, polyvinyl propyl ketone, polyvinyl butyl ketone, etc., or certain copolymers containing acrolein, methacrolein, or said vinyl alkyl ketone components, for example, 1 to 1 molar ratio copolymers of these components with styrene or alkyl methacrylates wherein the alkyl group contains from one to four carbon atoms, such as methyl, ethyl, propyl, or butyl methacrylates in the proportions from about 0.25 to 5 parts by weight of the said polymeric oxo-compound with one part by weight of an aminoguanidine compound such as aminoguanidine bicarbonate, aminoguanidine acetate, aminoguanidine butyrate, etc.; the reaction products of polyvinylsulfonates with C-aminopyridines of Reynolds et al. U.S. Pat. No. 2,768,078, issued Oct. 23, 1956, prepared by reacting alkyl and aryl polyvinyl sulfonates prepared as described in U.S. Pat. No. 2,531,468 and 2,531,469 both dated Nov. 28, 1950, under controlled conditions with C-aminopyridines or alkyl group substituted C-aminopyridines such as 2-amino-pyridine, 4-aminopyridine, the aminopicolines such as 2-amino-3-methylpyridine, 2-amino-4-methylpyridine, 2-amino-5-methylpyridine, 2-amino-6-methylpyridine and corresponding 4-aminomethyl derivatives which react in this reaction in exactly the same way, 2-amino-6-ethylpyridine, 2-amino-6-butylpyridine, 2-amino-amylpyridine, etc., the various aminolutidines such as, for example, 4-amino-2,6-dimethylpyridine and the various aminocollidines such as, for example, 2-amino-3-ethyl-4-methylpyridine, etc., the dialkylaminoalkyl esters or dialkylaminoalkylamino amides, e.g. such as those described by Carroll et al. U.S. Pat. No. 2,675,316, issued Apr. 13, 1954, prepared by reacting addition polymers containing carboxyl groups with a basic dialkylamino compound, for example, N-dialkyl amine ethyl esters of polymers or copolymers containing carboxyl groups; the addition type polymers containing periodically occurring quaternary groups of Sprague et al., U.S. Pat. No. 2,548,564, issued Apr. 10, 1951, including quaternary ammonium salts of vinyl substituted azines such as vinylpyridine and its homologs such as vinyl quinoline, vinylacridine, and vinyl derivatives of other six-membered heterocyclic ring compounds containing hydrogen atoms. These addition polymers include 2-vinylpyridine polymer metho-p-toluenesulfonate, 4-vinylpyridine polymer metho-p-toluenesulfonate.

Layers containing the dyes of the instant invention can be coated on a wide variety of supports. Typical supports are cellulose nitrate film, cellulose ester film, polyvinyl acetal film, polystyrene film, poly(ethylene terephthalate) film, polycarbonate film and related films of resinous materials as well as glass, paper, metal and the like. Supports such as paper which are coated with α-olefin polymers, particularly polymers of α-olefins containing two or more carbon atoms, as exemplified by polyethylene, polypropylene, ethylene-butene copolymers and the like can also be employed.

The photographic elements prepared according to the instant invention can be used in various kinds of photographic systems. In addition to being useful in X-ray and other nonoptically sensitized systems, they can also be used in orthochromatic, panchromatic and infrared sensitive systems. The sensitizing addenda can be added to photographic systems before or after any sensitizing dyes which are used.

The dyes of this invention can be used in emulsions intended for color photography, for example, emulsions containing color-forming couplers or emulsions to be developed by solutions containing couplers or other color-generating materials, emulsions of the mixed-packet type such as described in U.S. Pat. No. 2,698,794 of Godowsky issued Jan. 4, 1955; in silver dye-bleach systems; and emulsions of the mixed-grain type such as described in U.S. Pat. 2,592,243 of Carroll and Hanson issued Apr. 8, 1952.

Photographic layers containing the dyes of this invention can be used in diffusion transfer processes which utilize undeveloped silver halide in the nonimage areas of the negative to form a positive by dissolving the undeveloped silver halide and precipitating it on a receiving layer in close proximity to the original silver halide emulsion layer. Such processes are described in Rott, U.S. Pat. No. 2,352,014, Land U.S. Pat. No. 2,543,181 and Yackel et al. U.S. Pat. No. 3,020,155. Photographic layers containing the dyes of this invention can also be used in color transfer processes which utilize the diffusion transfer of an imagewise distribution of developer, coupler or dye from a light-sensitive layer to a second layer while the two layers are in close proximity to one another. Color transfer processes of this type are described in Yutzy, U.S. Pat. No. 2,856,142; Land et al. U.S. Pat. No. 2,983,606; Whitmore et al. British Pat. Nos. 904,364 and 840,731; and Whitmore et al. U.S. Pat. No. 3,227552.

The photographic elements using the light-absorbing layers of this invention have light-sensitive emulsion layers containing silver chloride, silver bromide, silver chlorobromide, silver iodide, silver bromoiodide, silver chlorobromoiodide, etc., as the light-sensitive material. Any light-sensitive silver halide emulsion layers may be used in these photographic elements including those described in Bacon et al. U.S. Pat. No. 3,447,927. The silver halide emulsion may be sensitized by any of the sensitizers commonly used to produce the desired sensitometric characteristics.

In general intermediates for, the dyes incorporated in the light-absorbing layers are obtained by reacting an appropriate hydrazine with a pyrylium salt. Representative dyes and intermediates used in the layers of this invention and their methods of preparation are illustrated by the following examples which are not intended to limit the invention.

EXAMPLE 1

1-Dimethylamino-3'-methyl-4,6-di-p-tolyl-2'-pyridothiacyanine perchlorate

A mixture of 83.4 g. of 1-dimethylamino-2-methyl-4,6-di-p-tolyl-pyridinium perchlorate and 80.7 g. of 3-methyl-2-methylthiobenzothiazolium p-toluenesulfonate in 275 ml. of acetonitrile is heated to 30° C. and 30.8 ml. of triethylamine added. The resulting mixture is stirred at room temperature for 5 minutes and then heated at reflux for 5 minutes. After cooling, the solvent is evaporated and the remaining solid slurried in 700 ml. of acetone. The solid is collected on a filter, washed with acetone, and dried in a vacuum oven at room temperature. The yield of dye is 35.5 g. (31 percent), m.p. 190–191°C. dec. λ477nm MeOH

EXAMPLE 2

1,3,3-Trimethyl-1'-(N-methylanilino)-4',6'-di-p-tolylindo-2'-pyridocarbocyanine perchlorate Triethylamine (1 g., 0.01 mole) is added to a mixture of 2-methyl-1-(N-methylanilino)-4,6-di-p-tolyl pyridinium perchlorate (3.4 g., 0.007 mole) and 2-(2-acetanilidovinyl)-1-3,3-trimethyl-3H-indolinium iodide (3.1 g., 0.007 mole) in 12 ml. of pyridine and 5 ml. of acetic anhydride. After heating this mixture is added to ether, the residue washed with ether and then solidified in aqueous sodium perchlorate. The crude product is recrystallized from ethanol to give 2.6 g. of dye, 56 percent, m.p. 157–158° C. dec. λ max 563 nm, in methanol.

EXAMPLE 3

1'-Dimethylamino-3-ethyl-4',6'-di-p-tolyl-oxa-2'-pyridocarbocyanine perchlorate

A mixture of 1-dimethylamino-2-methyl-4,6-di-p-tolyl pyridinium perchlorate (25.0 g., 0.06 mole) and 2-(2-acetanilidovinyl)-3-ethylbenzoxazolium iodide (26.0 g., 0.06 mole) in 100 ml. of pyridine, 5.7 ml. of acetic anhydride and 9 g. (0.09 mole) of triethylamine is heated 10 min. at less than 85°, cooled, and added to ether. The ether is decanted and the residue washed several times with ether, then solidified by treating with water and sodium perchlorate. The solid is collected, and recrystallized twice from ethanol with a little acetic acid to give 13.5 g. 38 percent of green crystals with a shiny reflex m.p. 175–177° C. dec. A methanol solution had λmax. 537 nm.

Anal. Calcd. for $C_{33}H_{34}N_3O_5Cl$: C, 67.40; H, 5.82; N,7.14
Found: C, 67.3; H, 5.7; N, 6.9.

EXAMPLE 4

4',6'-Bis-(4-chlorophenyl)-1'-dimethylamino-3-ethyl-oxa-2'-pyridocarbocyanine perchlorate In the manner described in example 3, 4,6-bis-(4-chlorophenyl)-1-dimethylamino-2-methyl pyridinium perchlorate is used to prepare the dye in 57 percent yield, m.p. 194–196° C. λmax. 545 nm. in methanol.

EXAMPLE 5

1'-Dimethylamino-3-ethyl-4', 6'-bis-(4-methoxyphenyl)-oxa-2'-pyridocarbocyanine perchlorate In the manner described in example 3, 1-dimethylamino-2,4-bis-(4methoxyphenyl)-6-methylpyridinium perchlorate is used to prepare the dye in 44 percent yield, m.p. 171–172° C. dec., λmax. 538 nm. in methanol.

EXAMPLE 6

1-Acetanilido-3'-ethyl-4,6-di-p-tolyl-2-pyridothiacarbocyanine perchlorate

To a mixture of 34.9 g. (0.075 moles) of 1-anilino-2-methyl-4,6-di-p-tolylpyridinium perchlorate and 22.5 g. (0.05 mole) of 2-(2-acetanilidovinyl)-3-ethylbenzothiazolium iodide in 200 ml. of acetonitrile is added 12 ml. (0.11 mole) of acetic anhydride and 9.8 ml. (0.072 mole) of triethylamine. The mixture is stirred at room temperature for 2 hours, then filtered, the dye washed with acetonitrile and ether, and dried. The yield of dye is 23.1 g. (66.5 percent), m.p. 207–208° C. dec. λmax. 594 nm. in MeOH.

EXAMPLE 7

1-(N-acetyl-4-methylanilino)-3'-ethyl-4,6-di-p-tolyl-2-pyridothiacarbocyanine perchlorate In the manner described in example 6, 2-methyl-1-(4-methylanilino)-4,6-di-p-tolyl pyridinium perchlorate is used to prepare the dye in 13 percent final yield m.p. 178–180° C. dec. λmax. 594 nm in methanol.

Calcd. for $C_{40}H_{38}N_3O_5SCl$: C, 67.83; H, 5.41; N,5.93
Found: C, 67.4; H,5.8; N,5.5.

EXAMPLE 8

1-Acetanilido-3'-ethyl-4,6-di-p-tolyl-4',5'-benzo-2-pyridothiacarbocyanine perchlorate A mixture of 1-anilino-2-methyl-4,6-di-p-tolyl pyridinium perchlorate (3.3 g., 0.007 mole) and 2-(2-anilinovinyl)-1-ethylnaphtho[1,2d]thiazolium p-toluenesulfonate (3.5 g., 0.007 mole) in 15 ml. of pyridine, 5 ml. of acetic anhydride, and 1 g. (0.01 mole) of triethylamine is heated 5 min. and added to ether. The residue is washed with ether, and solidified in aqueous sodium perchlorate. The crude product is recrystallized from alcohol to give 15 g. (29 percent) of dye, m.p. 189–192° C. dec. λmax. 613 nm in methanol. The anilino nitrogen is acetylated under the reaction conditions.

EXAMPLE 9

3′-Ethyl-1-(N-methylanilino)-4,6-di-p-tolyl-4′,5′-benzo-2-pyridothiacyanine perchlorate A mixture of 4.8 g. (0.01 mole) of 2-methyl-1-(N-methylanilino)-4,6-di-p-tolyl pyridinium perchlorate and 4.0g. (0.01 mole) of 1-ethyl-2-ethylthionaphtho[1,2-d]thiazolium ethosulfate in 15 ml. of pyridine is treated with 1.2 g. of triethylamine for 10 min. at 70°. The reaction is added to ether, and the ether-washed residue is treated with aqueous sodium perchlorate. The crude red dye is extracted with methanol and recrystallized from ethanol to afford 1.5 g., 32 percent, m.p. 189–190° C. dec., λmax. 507 nm, 383 nm in methanol.

EXAMPLE 10

1-Dimethylamino-4,6-bis-(4-methoxyphenyl)-3′-methyl-2-pyridothiazolinocarbocyanine perchlorate In the manner of example 3, 1-dimethylamino-2,4-bis-(4-methoxyphenyl)-6-methylpyridinium perchlorate and 2-(2-anilinovinyl)-3-methylthiazolinium iodide are reacted to give a product in 77 percent yield, m.p. 165–167° C. dec. λmax. 522 nm. in methanol.

Example 11

1′-Ethyl-1-(N-methylanilino)-4,6-di-p-tolyl-2-pyrido-4′-carbocyanine perchlorate A mixture of 2-methyl-1-(N-methylanilino)-4,6-di-p-tolyl pyridinium perchlorate (2.9 g., 0.006 mole) and 4-(2-anilinovinyl)-1-ethylquinolinium iodide (2.5 g., 0.006 mole) in 15 ml. of pyridine, 1 ml. of acetic anhydride and 0.8 g., (0.008 mole) of triethylamine are reacted at room temperature for 45 minutes. The reaction mixture is added to ether, and the residue is treated with acetonitrileethyl acetate at room temperature. A sticky solid is collected, washed further with ethyl acetate, and dried, 3.6 g. (90 percent yield), m.p. 107–113°C. dec., λmax 671 nm. in methanol.

EXAMPLE 12

1′-Ethyl-6′-methyl-1-(N-methylanilino)-4,6-di-p-tolyl-2-pyrido-2′-carbocyanine perchlorate A mixture of 2.4 g. (0.005 mole) of 2-methyl-1-(N-methylanilino)-4,6-di-p-tolyl pyridinium perchlorate and 1.7 g. (0.005 mole) of 2-(2-acetanilidovinyl)-1-ethyl-6-methylquinolinium iodide in 10 ml. of pyridine and 1.1 ml. of triethylamine are reacted at room temperature, and then added to ether. The ether-washed residue is solidified with aqueous sodium perchlorate, and the solid product dried. The crude material is extracted with hot ethanol (300 ml.) and the undissolved portion is treated with Norit in acetone at room temperature and filtered. The dye crystals obtained from the concentrated filtrate (0.4 g., 12 percent) have a melting point of 151–154° C. and λmax. 626 nm, in methanol.

EXAMPLE 13

5-[(1-Dimethylamino-4,6-di-p-tolyl-2(1H)-pyridylidene)ethylidene]-1,3-diethyl-2-thiobarbituric acid Triethylamine (1.2 g., 0.012 mole) is added to a mixture of 1-dimethylamino-2-methyl-4,6-di-p-tolyl pyridinium perchlorate (4.2 g., 0.01 mole) and 5-dimethylaminomethylene-1,3-diethyl-2-thiobarbituric acid (2.6 g., 0.01 mole) in 50 ml. of hot ethanol. After 30 minutes on the steam bath the mixture is cooled, and 4.8 g. of red product is collected. The crude material is extracted with hot ethanol, and the remainder is recrystallized from pyridine-methanol to give 0.3 g., 6 percent scarlet crystals, m.p. 203–204°C. dec. λmax. 499 nm in methanol.

EXAMPLE 14

3-[(1-N-methylanilino-4,6-di-p-tolyl-2(1H)-pyridylidene)ethylidene]2H-pyrido[1,2-a]pyrimidine-2,4(3H)-dione A mixture of 4.8 g. (0.01 mole) of 2-methyl-1-N-methylanilino-4,6-di-p-tolyl pyridinium perchlorate and 2.6 g. (0.01 mole) of 3-dimethylaminomethylene-2H-pyrido[1,2–a]pyrimidine-2,4(3H)-dione hydrochloride in 100 ml. of ethanol containing 2.3 g. (0.023 mole) of triethylamine is heated for 30 minutes on the steam bath. A yellow precipitate is filtered off and discarded, and the filtrate furnishes 2.7 g. of crude dye which is recrystallized twice from ethanol to give 1.3 g., 22 percent, m.p. 186–188°C. dec. λmax 502 nm., in methanol.

EXAMPLE 15

1-Anilino-3′-ethyl-4,6-di-p-tolyl-2-pyridothiocarbocyanine perchlorate

A mixture of 1-anilino-2-methyl-4,6-di-p-tolylpyridinium perchlorate (4.9 g. 0105 mole) and 2-(2-acetanilidovinyl)-3-ethylbenzothiazolium iodide (4.6 g., 0.01 mole) in 15 ml. of pyridine is treated with 3.2g. of triethylamine and heated to 70° for 5 minutes. The reaction mixture is washed with ether, and the insoluble residue is recrystallized from ethanol to give dye of m.p. 165–167° C. dec. λmax. 579 nm in methanol.

Anal. Calcd. for $C_{37}H_{34}N_3O_4SCl$: C, 68.13; H,5.25;

Found: C, 68.5; H, 5.4; N, 6.1.

EXAMPLE 16

1-Amino-3′-ethyl-2-pyridothiacarbocyanine iodide

In a manner similar to that described in example 1, this dye is prepared by reacting 1-amino-2-methylpyridinium iodide with an equivalent amount of 2-(2-acetanilidovinyl)-3-ethylbenzothiazolium iodide in acetonitrile.

EXAMPLE 17

3′-Methyl-4,6-di-p-tolyl-1-(4H-1,2,4-triazol-4-yl)-2-pyridothiazolinocarbocyanine perchlorate To a mixture of 3.1 g. (0.007 mole) of 2-methyl-4,6-di-p-tolyl-1-(4H-1,2,4-triazol-4-yl)-pyridinium perchlorate and 2.4 g. (0.007 mole) of 2-(2-anilinovinyl)-3-methylthiazolinium iodide in 20 ml. of pyridine is added 1 ml. of acetic anhydride and 2.1 ml. of triethylamine. After stirring for 30 minutes at 25° the mixture is added to ether, and the residue is crystallized from an ethanol acetone mixture to give 1.1 g. of dye (28 percent), m.p. 201–202° C., λmax. 542 nm in methanol.

EXAMPLE 18

1′-Dimethylamino-3-ethyl-4′,6′-dimethyl-oxa-2′-pyridocarbocyanine iodide

A solution of 1-dimethylamino-2,4,6-trimethylpyridinium tetrafluoroborate (2.0 g., 0.008 mole) and 2-(2-acetanilidovinyl)-3-ethylbenzoxzolium iodide (3.5 g., 0.008 mole) in acetonitrile is treated with triethylamine (1 g., 0.01 mole) and warmed to 60° for 20 minutes. The concentrated reaction mixture is washed with ether and the residue is chromatographed on alumina with chloroform/acetone to give the dye. λmax. 515 nm in MeOH.

EXAMPLE 19

1,1'-Bis(dimethylamino)-4,4',6,6'-tetra-p-tolyl-2,2'-pyridocarbocyanine perchlorate A solution of 1-dimethylamino-2-methyl-4,6-di-p-tolyl pyridinium perchlorate (2.1 g., 0.005 mole) in 20 ml. of acetonitrile is stirred with 0.9 ml. of diethoxymethylacetate and 0.7 ml. of tetramethylguanidine in the dark at room temperature for 40 minutes. A spectrographic analysis of the reaction mixture shows the presence of a dye having an absorption maximum at 637 mm. When dissolved in acetylnitrile. The dye photobleaches relatively rapidly.

EXAMPLE 20

2-Methyl-4,6-di-p-tolylpyrylium perchlorate

Acetic anhydride (567 ml., 6.0 mole) is added dropwise to sulfuric acid (161 ml., 3.0 mole) cooled in an ice bath, and the temperature raised to 70°–80° for 3 hours. To the cooled, brown solution is added 188 grams (1.4 mole) of 4'-methylacetophenone, in 140 ml. of acetic anhydride, and the temperature raised to 50° for 18 hours. Ethanol (300 ml.) is added to the chilled reaction, followed by ether and ethyl acetate to precipitate a yellow product. The crude solid is dissolved in hot water, treated with Norit, and filtered. Aqueous sodium perchlorate is added to the warm filtrate, resulting in immediate precipitation of the product, which is collected after cooling, washed with water and dried. 78.1 g., 29.8 percent yield, m.p. 273–277° C.

EXAMPLE 21

1-Dimethylamino-2-methyl-4,6-di-p-tolyl pyridinium perchlorate

A suspension of 2-methyl-4,6-di-p-tolyl pyrylium perchlorate (75.0 g., 0.2 mole) in 800 ml. of benzene is treated with 1,1-dimethylhydrazine (18 g., 0.3 mole) at room temperature, and then heated to reflux for 1.5 hours. Water (100 percent of theoretical) is collected in a Dean Stark trap. The reaction mixture is chilled, and the light yellow solid is collected, washed with benzene and dried to give 78.2 g. (94 percent) of product, m.p. 212–215° C.

EXAMPLE 22

2-Methyl-1-(N-methylanilino)-4,6-di-p-tolyl pyridinium perchlorate

A suspension of 2-methyl-4,6-di-p-tolyl pyrylium perchlorate (18.7 g., 0.05 mole) in 225 ml. of benzene is treated with 7.9 g. (0.065 mole) of 1-methyl-1-phenylhydrazine, and the mixture is heated 1.5 hours. Water (1 ml.) is collected in a Dean Stark trap. The reaction mixture is cooled and the precipitate is collected, washed with benzene and dried. 21.1 g., 88 percent, m.p. 177–179° C.

EXAMPLE 23

1-Anilino-2-methyl-4,6-di-p-tolyl pyridinium perchlorate

In the same manner as described in example 21, phenylhydrazine (20.5 g., 0.19 mole) and 2-methyl-4,6-di-p-tolyl pyrylium perchlorate (56.2 g., 0.15 mole) are reacted in benzene to give 57.6 g. (83 percent) of product, m.p. 182–187Φ⅛ C.

EXAMPLE 24

2-Methyl-1-(4-methylanilino)-4,6-di-p-tolyl pyridinium perchlorate

A suspension of p-tolyhydrazine hydrochloride (12.7 g., 0.08

A suspension of 25.2 300 ml. of benzene is treated with an aqueous solution of 15 g. of sodium bicarbonate. After stirring for 1 hour all solid is dissolved; the layers are separated, and the benzene layer is dried briefly (MgSO₄) and added to 15 g. (0.04 mole) of 2-methyl-4,6-di-p-tolyl pyrylium perchlorate. The mixture is refluxed 2 hours utilizing a Dean Stark trap to collect the water formed. The cooled reaction is filtered and the yellow precipitate washed with benzene. 14.5 g., 75 percent, m.p. 182–195° C.

EXAMPLE 25

2,4-Bis-(4-chlorophenyl)-1-dimethylamino-6-methylpyridinium perchlorate

A suspension of 25.2 g. (0.0605 mole) of 2,4-Bis-(4-chlorophenyl)-6-methyl pyrylium perchlorate in 300 ml. of benzene is treated with 6 g. (0.1 mole) of 1,1-dimethylhydrazine and the mixture is heated 1 hour with 1 ml. of water collected in a Dean Stark trap. From the cooled solution is collected 11.6 g. of white solid, 42 percent yield, m.p. 206–210Φ⅛ C.

EXAMPLE 26

1-Dimethylamino-2,4-bis-(4-methoxyphenyl)-6-methyl pyridinium perchlorate

A mixture of 2,4-bis-(4-methoxyphenyl)-6-methyl pyrylium iodide (18.1 g., 0.041 mole) and 1,1-dimethylhydrazine (4.8 g., 0.08 mole) in 225 ml. of benzene is heated to reflux for 2 hours, utilizing a Dean Stark trap for removal of water. The cooled reaction mixture is concentrated under reduced pressure, and the black viscous residue is solidified by treatment with ethyl acetate. The solid is collected, dissolved in 100 ml. of hot 50 percent aqueous ethanol, and treated with aqueous sodium perchlorate solution. Yellow solid is collected, 13.3 g., 72 percent yield, of m.p. 158–162° C.

EXAMPLE 27

1-Dimethylamino-2,4,6-trimethylpyridinium tetrafluoroborate

Dimethylhydrazine (4.5 g., 0.075 mole) is added to a suspension of 2,4,6-trimethylpyrylium tetrafluoroborate (10.5 g., .05 mole) in 175 ml. of benzene, and the mixture refluxed for 1.5 hours. The reaction mixture is concentrated and the residue crystallized from ethanol to give 7.2 g. of product (57 percent) as transparent white crystals, m.p. 135–140° C.

EXAMPLE 28

2-Methyl-4,6-di-p-tolyl-1-(4H-1,2,4-triazol-4-yl)-pyridinium perchlorate

A mixture of 2-methyl-4,6-di-p-tolyl pyrylium perchlorate (15.0 g., 0.04 mole) and 4-amino-4H-1,2,4-triazole (3.8 g., 0.045 mole) is heated in 200 ml. of benzene for 1 hour. The solid obtained on cooling is recrystallized from ethanol/acetone to give a 70 percent yield of product, m.p. 210–211Φ⅛ C.

Other representative dyes useful in the novel layers of this invention include 3'-allyl-1-dimethylamino-4,6-di-p-tolyl-2-pyridothiacarbocyanine perchlorate and 1-dimethylamino-3'-phenyl-4,6-di-p-tolyl-2-pyridothiacarbocyanine perchlorate, these dyes being prepared in a manner similar to those described in the preceding examples.

The following examples illustrate the properties and uses of the dyes and light-absorbing layers of this invention.

EXAMPLE 29

The bleachability of the novel layers of this invention when subjected to light in either an acidic, basic or neutral medium is demonstrated by preparing three equivalent elements containing a transparent poly(ethylene terephthalate) support having a layer of the compound of example 3 dispersed in gelatin coated at a coverage of 6.0 mg. dye/ft.$^2$. One element is immersed in acetic acid, another is immersed in triethylamine and the third is immersed in methanol. Each element is then illuminated with a 60 watt bulb at a distance of 6 inches for 120 minutes. All three elements exhibit substantial bleaching, the amine and acid having little or no substantial effect on the bleaching process.

EXAMPLE 30

The irreversible bleaching characteristics of the novel layers of this invention are demonstrated by preparing four equivalent elements, each containing a transparent poly(ethylene) (ethylene terephthalate) support having a layer of the compound of example 3 dispersed in gelatin coated at a coverage of 6.0 mg. dye/ft.$^2$. Each of these elements is irradiated for 120 minutes with a 60-watt bulb at a distance of 6 inches causing bleaching of the layer. After bleaching in this manner, one element is immersed in triethylamine, another is immersed in acetic acid, a third is immersed in hydrochloric acid and the fourth is not treated. There is no substantial regeneration of the original color of the dye in either medium.

EXAMPLE 31

The dyes set forth in tables III and IV below are dissolved in methyl pyrrolidinone and methanol and tested for stability. The solutions are then added to gelatin to yield a 4 percent solution. The melts are coated on a poly(ethylene terephthalate) film support at 3 to 6 mg. of dye/ft.$^2$ and 400 mg. of gelatin/ft.$^2$. The following is a description of the tests run on sets of these coatings:

1. Incubation—1 week at 78° F./50 percent RH
2. Subjection to heat—a thermostatted heating block is provided on which film strips are uniformly heated to controlled temperatures for specified lengths of time. Samples are heated to temperatures of 150 to 200° C., and the amount of dye fading is determined spectrophotometrically.
3. Subjection to light—The coatings are exposed for a constant time to light from a 300-watt tungsten bulb. The light field is rendered uniform by passage through a mirror tunnel and diffusing screen, and the amount of dye fading is determined spectrophotometrically. The results of this test are in table III. The coatings listed in table IV are placed in a Kodak Carousel slide projector (500-watt bulb) and subjected to illumination for 15 seconds at a distance of about 3½ inches from the light source.

The coatings listed in table IV are also given a "heat and light" test in which the coatings are first subjected to the heat test for 5 sec. at 200° C., and then to illumination in a Kodak Carousel slide projector for 15 sec. The results in tables III and IV demonstrate the stability of the dyes on incubation and their instability to light and heat.

EXAMPLE 32

Antihalation layers are prepared from the dyes of examples 1–19 by adding each to a gelatin solution and coating each solution on a heat-resistant transparent poly(ethylene terephthalate) support at a coverage of about 6.0 mg./ft.$^2$. Over each of these antihalation layers is coated (at 270 mg. Ag/ft.$^2$) a panchromatically sensitized gelatino silver chlorobromide emulsion prepared by slowly adding simultaneously an aqueous solution of silver nitrate and an aqueous solution of alkali metal halide to an agitated aqueous gelatin solution containing $Bi(NO_3)_3 \cdot 5H_2O$. About 4 mole percent of a halogen acceptor, dithiourazole hydrazine salt, based on the silver content, is added to the emulsion. These elements are exposed to an image bearing source in a Kodak Verifax Regent Printer containing 20, 7-watt bulbs at a distance of about 2 inches from the light source for 8 seconds. After exposure, the elements are heated at about 235° C. for 5 seconds, after which they are photodeveloped for 5 minutes at 6 inches from two 8-watt fluorescent lamps in a white reflector. Each of the resulting images on the transparencies is very sharp.

EXAMPLE 33

For comparison purposes, example 32 is repeated except that no antihalation layer is provided. The image reproduced on the resultant transparency is not nearly as sharp as those in example 32.

EXAMPLE 34

Antihalation layers are prepared from the dyes of examples 1–19 by adding each to a gelatin solution and coating each solution on a heat-resistant transparent poly(ethylene terephthalate) support at a coverage of about 6.0 mg./ft.$^2$. Over each of these antihalation layers is coated (at a coating weight after drying, of about 1 gram/sq. ft.) a dispersion prepared in the following manner:

To 400 ml. of a 1:1 acetone-toluene mixture are added the following materials

| | |
|---|---|
| silver behenate | 42.0 g. |
| behenic acid | 32.0 g. |
| phthalazinone | 10.0 g. |
| poly(vinyl butyral) | 15.0 g. |
| sodium bromide | 2.4 g. |

The dispersion is ball-milled with ceramic balls for 18 hours. After the balls are removed, the dispersion is further diluted with 500 ml. more of the acetone-toluene mixture. Twelve mg. of a sensitizing dye, 3-ethyl-5-[(3-ethyl-2(3H)-benzothiazolylidene)isopropylidene]-2-thio-2,4-oxazolidinedione in acetone solution, and 4.9 mg. of 2,2'-methylene bis-(4-methyl-6-t-butylphenol) in an acetone solution are added to the dispersion. The sodium bromide reacts with a small part of the silver behenate to form a small amount of light sensitive

TABLE III.—OPTICAL DENSITY [1]

| Dye. Ex. | $\lambda_{max}$ | Fresh | Incubation 1 wk., 78°, 50% RH | Heat | | | | Light [2] | | |
|---|---|---|---|---|---|---|---|---|---|---|
| | | | | 5"/150° | 10"/150° | 10"/200° | 20"/200° | 10" | 30" | 60" |
| 1 | 488 | 0.39 | 0.33 | 0.39 | 0.30 | 0.07 | 0.04 | 0.32 | 0.32 | 0.21 |
| 2 | 580 | 0.74 | 0.66 | 0.57 | 0.43 | 0.03 | 0.03 | 0.74 | 0.77 | 0.68 |
| 3 | 553 | 0.66 | 0.66 | 0.55 | 0.57 | 0.04 | 0.04 | 0.60 | 0.54 | 0.54 |
| 6 | 612 | 0.24 | 0.28 | 0.24 | 0.20 | 0.02 | 0.02 | 0.24 | 0.22 | 0.23 |
| 7 | 612 | 0.54 | 0.52 | 0.51 | 0.43 | 0.01 | 0.01 | 0.43 | 0.43 | 0.42 |
| 8 | 630 | 0.58 | 0.48 | 0.43 | 0.38 | 0.03 | 0.03 | 0.42 | 0.38 | 0.40 |
| 10 | 538 | 0.52 | 0.46 | 0.36 | 0.42 | 0.03 | 0.04 | 0.48 | 0.44 | 0.47 |
| 14 | 500 | 0.31 | 0.37 | 0.29 | 0.33 | 0.08 | 0.07 | 0.34 | 0.31 | 0.28 |

[1] Data uncorrected for gelatin absorbance.
[2] 300-watt bulb through a mirror tunnel.

TABLE IV.—OPTICAL DENSITY [1]

| Dye Ex. | $\lambda_{max}$ | Fresh | Incubation 1 wk., 78°, 50% RH | Heat | | | Light [2] 15" | Heat, 5" at 200° plus light,[2] 15" |
|---|---|---|---|---|---|---|---|---|
| | | | | 10"/150° | 5"/200° | 10"/200° | | |
| 4 | 559 | 0.62 | 0.65 | 0.53 | 0.04 | 0.03 | 0.30 | 0.03 |
| 5 | 564 | 0.76 | 0.71 | 0.64 | 0.58 | 0.10 | 0.17 | 0.18 |
| 9 | 520 | 0.32 | 0.34 | 0.25 | 0.23 | 0.09 | 0.09 | 0.07 |
| 12 | 647 | 0.34 | 0.40 | 0.09 | 0.05 | 0.05 | 0.33 | 0.05 |

[1] Data uncorrected for gelatin absorbance.
[2] Coatings placed in Kodak Carousel slide projector and subjected to illumination.

silver bromide as described in U.S. Pat. No. 3,457,075. During and following this operation, the sheet is kept under total darkness. A portion of the sheet, prepared as aforesaid, is exposed through a step wedge at up to about 90 foot-candles for 1 second and is then heated at 105° C. for 2 seconds. A visible reproduction of the image in the form of dense, brown, black sharply outlined image areas on a light tan background is obtained.

EXAMPLE 35

Antihalation layers are prepared from the dyes of examples 1-19 by adding each to a gelatin solution and coating each solution on a heat resistant transparent poly(ethylene terephthalate) support at a coverage of about 6.0 mg./ft.² Over each of these antihalation layers is coated (at a coverage of about 6.5 to 7 grams per square foot) a coating mixture prepared in the following manner:

A dispersion is prepared by ball milling for 24 hours, 9 g. (0.02 mole) silver behenate, 6.8 g. (0.02 mole) behenic acid, 3 g. polystyrene, and 81.2 g. anhydrous ethyl acetate. A solution is prepared by dissolving 6.2 g. (0.04 mole) protocatechuic acid, 8 g. diphenylphthalate, 0.4 g. citric acid, and 0.4 g. phthalic anhydride in 85 g. anhydrous ethyl acetate. The coating mixture is prepared by mixing 50 g. of the dispersion and 30 g. of the above solution with 40 g. of ethyl acetate. This coating is then overcoated with a 2 percent solution of polystyrene in ethyl acetate at a coverage of about 4 g. of the solution per square foot. Next a coating of 10.4 g. of Dow 512K latex (a styrene-butadiene latex), diluted to 100 g. with water is coated at a spread of about 4 g. per square foot. The coated sheet is finally coated with a geltino-silver chloride emulsion at a silver coverage of 1 mole of silver per 35,000 square feet. The emulsion coating is dried and exposed in the usual manner to daylight quality radiation through a line image. The exposed material is then treated for 10 seconds with an ordinary photographic developing solution and then dried in air. Only a weak silver image appears. This is intensified to a black image using infrared radiation obtained by passing it through a thermographic copying apparatus of the type described in Miller U.S. Pat. No. 2,740,895.

The invention has been described in detail with particular reference to preferred embodiments thereof, but it will be understood that variations and modifications can be effected within the spirit and scope of the invention.

I claim:

1. A photographic element comprising a support having thereon at least one light-sensitive silver halide emulsion layer and at least one light-absorbing layer comprising a 1-aminopyridinium dye.

2. A photographic element comprising a support having thereon at least one light-sensitive silver halide emulsion layer and at least one light-absorbing layer comprising a dye having a formula selected from the group consisting of

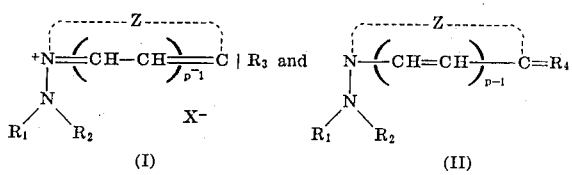

wherein:
$p$ 1 and $R_2$ are each selected from the group consisting of:
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;
$R_3$ is a methine linkage terminated by a heterocyclic nucleus of the type contained in cyanine dyes;
$p$ is an integer from 1 to 2;
$R_4$ is a methine linkage terminated by a heterocyclic nucleus of the type contained in merocyanine dyes;
$X^1$ is an acid anion; and
Z represents the atoms necessary to complete a five to six membered heterocyclic nucleus.

3. A photographic element comprising a transparent support having on one side thereof at least one light-sensitive silver halide emulsion layer and on the opposite side of said support and contiguous thereto at least one light-absorbing layer comprising a dye having a formula selected from the group consisting of $$\left(-N\overset{Z}{=}\!\!\!\!\!\overset{}{\underset{R_1\;\;R_2}{\overset{+}{N}}}\!\!\!\!\!-\!\!\!\left(CH-CH\right)_{p-1}\!\!=\!C\mid R_3\right)\;\text{and}\;\left(N\!\!-\!\!\!\left(CH=CH\right)_{p-1}\!\!-\!C=R_4\right)$$

$$(I)\qquad\qquad(II)$$

wherein:
$R_1$ and $R_2$ are each selected from the group consisting of:
a. an alkyl group
b. an acyl group
c. hydrogen,
d. an aryl group,
e. a heterocyclic nucleus containing five to six members in the hetero nucleus, and
f. joined together to complete a five to six membered heterocyclic nucleus;
$R_3$ is a methine linkage terminated by a heterocyclic nucleus of the type contained in cyanine dyes;
$R_4$ is a methine linkage terminated by a heterocyclic nucleus of the type contained in merocyanine dyes;
$X^1$ is an acid anion;
Z represents the atoms necessary to complete a five to six membered heterocyclic nucleus; and
$p$ is an integer from 1 to 2.

4. A photographic element comprising a support having thereon at least one light-sensitive silver halide emulsion layer and at least one light-absorbing layer comprising a dye having a formula selected from the group consisting of $$R_7\!\!-\!\!\overset{R_8}{\underset{\underset{R_1\;\;R_2}{\overset{+}{N}}}{\overset{}{N}}}\!\!-\!\!\left(L\!=\!L\right)_{n-1}\!\!=\!\!L\!=\!C\!\!-\!\!\left(CH\!=\!CH\right)_{x-1}\!\!-\!N\!\!-\!R_6\qquad X^-$$

and $$R_7\!\!-\!\!\overset{R_8}{\underset{\underset{R_1\;\;R_2}{\overset{}{N}}}{\overset{}{N}}}\!\!-\!\!\left(L\!-\!L\right)_m\!\!=\!C\!\cdots\!C\!=\!O\quad Q_2$$

wherein:
$Q_1$ and $Q_2$ each represent the nonmetallic atoms necessary to complete a five to six membered heterocyclic nucleus;
$R_1$ and $R_2$ are each selected from the group consisting of
a. an alkyl group,
b. an acyl group,
c. hydrogen,
d. an aryl group,
e. a heterocyclic nucleus containing five to six members in the hetero nucleus, and f. joined together to complete a five to six membered heterocyclic nucleus;

$R_6$ is selected from the group consisting of an alkyl group, an alkenyl group, an aryl group and an amino group;

$R_7$ and $R_8$ are each selected from the group consisting of
a. a hydrogen atom,
b. an alkyl group, and
c. an aryl group;

$n$ is a positive integer from 1 to 3;
$m$ is a positive integer from 1 to 2;
$g$ is a positive integer from 1 to 2;
L is a methine linkage; and
$X^1$ is an acid anion.

5. A photographic element comprising a transparent support having on one side thereof at least one light-sensitive silver halide emulsion layer and on the opposite side of said support and contiguous thereto at least one light-absorbing layer comprising a dye having a formula selected from the group consisting of

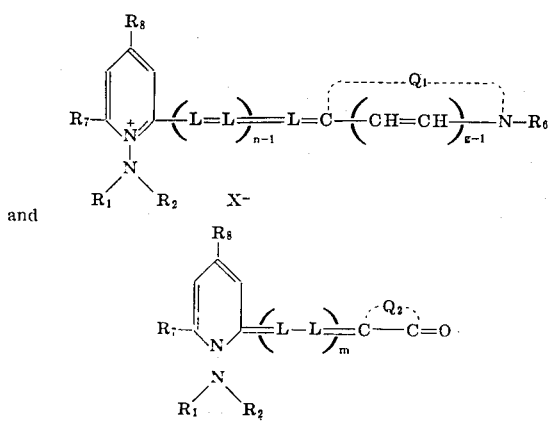

and wherein:
$Q_1$ and $Q_2$ each represent the nonmetallic atoms necessary to complete a five to six membered heterocyclic nucleus;
$R_1$ and $R_2$ are each selected from the group consisting of
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

$R_6$ is selected from the group consisting of an alkyl group, an alkenyl group, an aryl group, and an amino group;
$R_7$ and $R_8$ are each selected from the group consisting of
a. a hydrogen atom,
b. an alkyl group, and
c. an aryl group;

$n$ is a positive integer from 1 to 3;
$m$ is a positive integer from 1 to 2;
$g$ is a positive integer from 1 to 2;
L is a methine linkage, and
$X^1$ is an acid anion.

6. A photographic element comprising a support having thereon at least one light-sensitive silver halide emulsion layer and at least one light-absorbing layer comprising at least one dye selected from the group consisting of
1-dimethylamino-3'-methyl-4,6-di-p-tolyl-2-pyridothiacyanine perchlorate
1'-dimethylamino-3-ethyl-4',6'-di-p-tolyl-oxa-2'-pyridocarbocyanine perchlorate 1-acetanilido-3'-ethyl-4,6-di-p-tolyl-2-pyridothia-carbocyanine perchlorate 7. A photographic element comprising a support having thereon at least one light-sensitive silver halide emulsion layer and at least one light-absorbing layer comprising 1-dimethylamino-3'-methyl-4,6-di-p-tolyl-2-pyridothiacyanine perchlorate.

8. A photographic element comprising a support having thereon at least one light-sensitive silver halide emulsion layer and at least one light-absorbing layer comprising 1'-dimethylamino-3-ethyl-4'6 ,6'-di-p-tolyl-oxa-2'-pyridocarbocyanine perchlorate.

9. A photographic element comprising a support having thereon at least one light-sensitive silver halide emulsion layer and at least one light-absorbing layer comprising 1-acetanilido-3'-ethyl-4,6-di-p-tolyl-2-pyridothiacarbocyanine perchlorate.

10. A light-absorbing hydrophilic colloid layer containing a 1-aminopyridinium dye.

11. A light-absorbing hydrophilic colloid layer containing a dye having a formula selected from the group consisting of

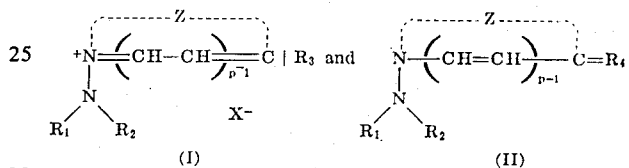

wherein:
$R_1$ and $R_2$ are each selected from the group consisting of
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

$R_3$ is a methine linkage terminated by a heterocyclic nucleus of the type contained in cyanine dyes;
$p$ is an integer from 1 to 2;
$R_4$ is a methine linkage terminated by a heterocyclic nucleus of the type contained in merocyanine dyes;
$X^1$ is an acid anion; and
Z represents the atoms necessary to complete a five to six membered heterocyclic nucleus.

12. A light-absorbing hydrophilic colloid layer containing a dye having a formula selected from the group consisting of

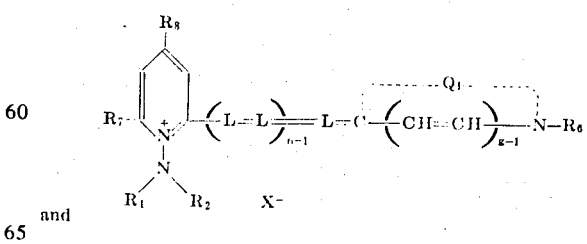

and

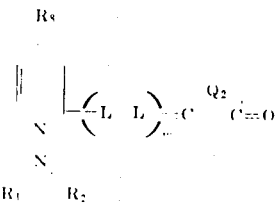

wherein:

$Q_1$ and $Q_2$ each represent the nonmetallic atoms necessary to complete a five to six membered heterocyclic nucleus;

$R_1$ and $R_2$ are each selected from the group consisting of
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

$R_6$ is selected from the group consisting of an alkyl group, an alkenyl group, an aryl group and an amino group, $R_7$ and $R_8$ are each selected from the group consisting of
a. a hydrogen atom,
b. an alkyl group, and
c. an aryl group;

$n$ is a positive integer from 1 to 3;
$m$ is a positive integer from 1 to 2;
$g$ is a positive integer from 1 to 2;
$L$ is a methine linkage; and
$X^1$ is an acid anion.

13. A light-absorbing hydrophilic colloid layer containing at least one dye selected from the group consisting of
1-dimethylamino-3'-methyl-4,6-di-p-tolyl-2-pyridothiacyanine perchlorate
1'-dimethylamino-3-ethyl-4',6'-di-p-tolyl-oxa-2'-pyridocarbocyanine perchlorate
1-acetanilido-3'-ethyl-4,6-di-p-totlyl-2pyridothiacarbocyanine perchlorate.

14. A light-absorbing hydrophilic colloid layer containing a dye comprising 1-dimethylamino-3'-methyl-4,6-di-p-tolyl-2-pyridothiacyanine perchlorate.

15. A light-absorbing hydrophilic colloid layer containing a dye comprising 1'-dimethylamino-3-ethyl-4',6'-di-p-tolyl-oxa-2'-pyridocarbocyanine perchlorate.

16. A light-absorbing hydrophilic colloid layer containing a dye comprising 1-acetanilido-3'-ethyl-4,6-di-p-tolyl-2-pyridothiacarbocyanine perchlorate.

17. A photographic element comprising a support having thereon at least one light-sensitive silver halide emulsion layer and at least one light-absorbing layer comprising a hydrophilic colloid containing a dye having a formula selected from the group consisting of (I) and (II)

wherein:

$R_1$ and $R_2$ are each selected from the group consisting of:
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

$R_3$ is a methine linkage terminated by a heterocyclic nucleus of the type contained in cyanine dyes;
$p$ is an integer from 1 to 2;
$R_4$ is a methine linkage terminated by a heterocyclic nucleus of the type contained in merocyanine dyes;
$X^1$ is an acid anion; and
$Z$ represents the atoms necessary to complete a five to six membered heterocyclic nucleus.

18. The photographic element of claim 17 wherein the hydrophilic colloid is gelatin.

19. A photographic element comprising a support having thereon at least one light-sensitive silver halide emulsion layer and at least one light-absorbing layer comprising a hydrophilic colloid containing a dye having a formula selected from the group consisting of and wherein:

$Q_1$ and $Q_2$ each represent the nonmetallic atoms necessary to complete a five to six membered heterocyclic nucleus;

$R_1$ and $R_2$ are each selected from the group consisting of:
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

$R_6$ is selected from the group consisting of an alkyl group, an alkenyl group, an aryl and an amino group;

$R_7$ and $R_8$ are each selected from the group consisting of
a. a hydrogen atom,
b. an alkyl group, and
c. an aryl group;

$n$ is a positive integer from 1 to 3;
$m$ is a positive integer from 1 to 2;
$g$ is a positive integer from 1 to 2;
$L$ is a methine linkage; and
$X^1$ is an acid anion.

20. The photographic element of claim 19 wherein the hydrophilic colloid is gelatin.

21. A photographic element comprising:
a. a support,
b. a light-sensitive silver halide layer wherein said silver halide is formed in the presence of trivalent metal ions, said silver halide having a halogen acceptor contiguous thereto, and
c. a light-absorbing layer comprising a dye having a formula selected from the group consisting of and erein:

Q₁ and Q₂ each represent the nonmetallic atoms necessary to complete a five to six membered heterocyclic nucleus;

R₁ and R₂ are each selected from the group consisting of:
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

R₆ is selected from the group consisting of an alkyl group, an alkenyl group, an aryl group, and an amino group;

R₇ and R₈ are each selected from the group consisting of
a. a hydrogen atom,
b. an alkyl group, and
c. an aryl group;

$n$ is a positive integer from 1 to 3;
$m$ is a positive integer from 1 to 2;
$g$ is a positive integer from 1 to 2;
L is a methine linkage; and
X¹ is an acid anion.

22. A photodevelopment process for preparing visible silver iotographic images in a fine-grain silver halide photographic intout material comprising the steps of
a. providing a photographic element comprising a support having coated thereon a layer of an emulsion comprising gelatin and silver halide grains which have trivalent metal ions therein, said grains having been formed in an acidic media, and wherein said silver halide grains have a halogen acceptor contiguous thereto, and a light-absorbing layer comprising a dye having a formula selected from the group consisting of

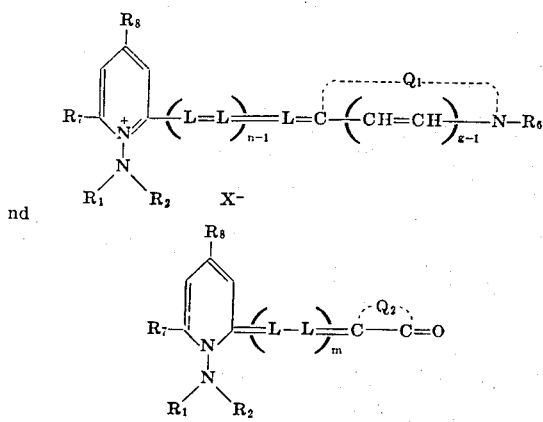

and vherein:

Q₁ and Q₂ each represent the nonmetallic atoms necessary to complete a five to six membered heterocyclic nucleus;

R₁ and R₂ are each selected from the group consisting of
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

R₆ is selected from the group consisting of an alkyl group, an alkenyl group, an aryl group, and an amino group;

R₇ and R₈ are each selected from the group consisting of
a. hydrogen atom,
b. an alkyl group, and
c. an aryl group;

$n$ is a positive integer from 1 to 3;
$m$ is a positive integer from 1 to 2;
$g$ is a positive integer from 1 to 2;
L is a methine linkage; and
X¹ is an acid anion;

b. imagewise exposing said element to form a latent image,
c. heating said exposed element to at least about 300° F. to repress printing out of unexposed areas of said element, and
d. thereafter uniformly exposing said heated element to light to produce a visible silver image.

23. A photographic process for preparing visible photographic images comprising the steps of
a. providing a photographic element comprising a support having coated thereon a layer containing (1) photosensitive silver halide and (2) heat-sensitive reactant image-forming means including a water-insoluble silver salt of a long chain fatty acid as an oxidizing agent, a reducing agent for silver ion, and a light-absorbing layer comprising a dye having a formula selected from the group consisting of

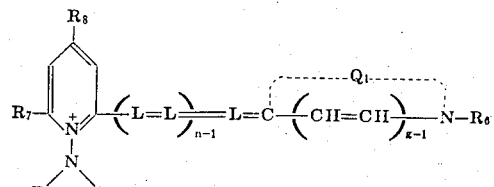

and

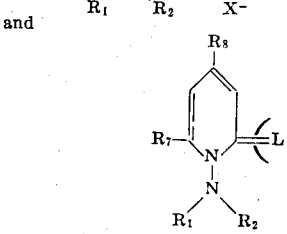

wherein:

Q₁ and Q₂ each represent the nonmetallic atoms necessary to complete a five to six membered heterocyclic nucleus;

R₁ and R₂ are each selected from the group consisting of
a. an alkyl group,
b. an acyl group,
c. hydrogen,
d. an aryl group,
e. a heterocyclic nucleus containing five to six members in the hetero nucleus, and
f. joined together to complete a five to six membered heterocyclic nucleus;

R₆ is selected from the group consisting of an alkyl group, an alkenyl group, an aryl group, and an amino group;

R₇ and R₈ are each selected from the group consisting of
a. hydrogen atom,
b. an alkyl group, and
c. an aryl group;

$n$ is a positive integer from 1 to 3;
$m$ is a positive integer from 1 to 2;
$g$ is a positive integer from 1 to 2;
L is a methine linkage; and
X¹ is an acid anion;

b. imagewise exposing said element to form a latent image and
c. heating said exposed element to at least about 90° C. to produce a visible image.

24. A photographic process for preparing visible photographic images comprising the steps of
a. providing a photographic element comprising a support having coated thereon
i. a heat-sensitive layer and a photosensitive layer, said respective layers being both coated on said support in heat transmissive contact with each other, said heat-sensitive layer consisting of a coating composition that is substantially uneffected by radiant energy including infrared radiation and which comprises a heat-sensitive reactant which is capable of producing a visible darkening in said heat-sensitive layer, in addition to visible darkening caused by photosensitive metal salt reduction by thermographic reaction at a temperature above 55° C. and below the char temperature of the sheet, and said photosensitive layer being a photographic silver halide emulsion containing 1 mole of silver halide per 2,000 to 850,000 square feet of the coated layer, and ii. a light-absorbing layer comprising a dye having a formula selected from the group consisting of

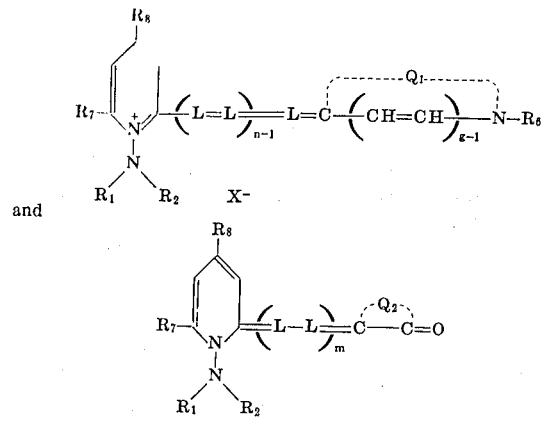

and wherein:
Q₁ and Q₂ each represent the nonmetallic atoms necessary to complete a five to six membered heterocyclic nucleus;
R₁ and R₂ are each selected from the group consisting of
  a. an alkyl group
  b. an acyl group
  c. hydrogen,
  d. an aryl group,
  e. a heterocyclic nucleus containing five to six members in the hetero nucleus, and
  f. joined together to complete a five to six membered heterocyclic nucleus;
R₆ is selected from the group consisting of an alkyl group, an alkenyl group, an aryl group, and an amino group;
R₇ and R₈ are each selected from the group consisting of
  a. hydrogen atom,
  b. an alkyl group, and
  c. an aryl group;
n is a positive integer from 1 to 3;
m is a positive integer from 1 to 2;
g is a positive integer from 1 to 2;
L is a methine linkage; and
X¹ is an acid anion;

b. imagewise exposing said element to form a latent image and
c. heating said exposed element to at least about 55° C. to produce a visible image.

25. A photographic process for preparing visible photographic images comprising the steps of
a. providing a photographic element comprising a support having coated thereon
  i. a layer of a composition which has dispersed therein a heat-sensitive component and a photosensitive component, said heat-sensitive component being a heat-sensitive reactant that is capable of producing a visible darkening in said layer, in addition to visible darkening caused by photosensitive metal salt reduction, by thermographic reaction at a temperature about 55° C. and below the char temperature of said sheet and that is substantially uneffected by radiant energy including infrared radiation, and said photosensitive component being photographic silver halide dispersed in said layer at a concentration of 1 mole silver halide per 2,000 to 850,000 square feet of said coated layer, and
  ii. a light-absorbing layer comprising a dye having a formula selected from the group consisting of

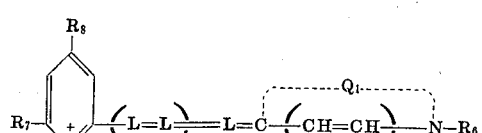

and

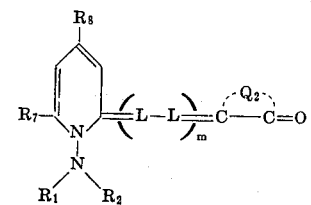

wherein:
Q₁ and Q₂ each represent the nonmetallic atoms necessary to complete a five to six membered heterocyclic nucleus;
R₁ and R₂ are each selected from the group consisting of
  a. an alkyl group,
  b. an acyl group,
  c. hydrogen,
  d. an aryl group,
  e. a heterocyclic nucleus containing five to six members in the hetero nucleus, and
  f. joined together to complete a five to six membered heterocyclic nucleus;
R₆ is selected from the group consisting of an alkyl group, an alkenyl group, an aryl group, and an amino group;
R₇ and R₈ are each selected from the group consisting of
  a. a hydrogen atom,
  b. an alkyl group, and
  c. an aryl group;
n is a positive integer from 1 to 3;
m is a positive integer from 1 to 2;
g is a positive integer from 1 to 2;
L is a methine linkage; and
X¹ is an acid anion;

b. imagewise exposing said element to form a latest image and
c. heating said exposed element to at least about 55° C. to produce a visible image.

* * * * *

PO-1050
(5/69)

UNITED STATES PATENT OFFICE
CERTIFICATE OF CORRECTION

Patent No. 3,619,194                    Dated November 9, 1971

Inventor(s) Gary F. Mitchell

It is certified that error appears in the above-identified patent and that said Letters Patent are hereby corrected as shown below:

In the Specification:

Column 1, line 71, that part of formula (I) reading "$)\!=\!ClR_3$" should read --- $)\!=\!C\text{-}R_3$ ---.
$\phantom{xx}p\text{-}1$ $\phantom{xxxxxxxxxxxxxxxxxxxxxxxxxx}p\text{-}1$ Column 2, line 29, after "nitrogen", ---,--- should be inserted.

Column 2, line 47, "$X^1$" should read ---$X^-$---.

Column 2, line 63, that part of formula (III) reading "$CH\,)_{g\text{-}1}N$" should read --- $CH\!-\!)_{g\text{-}1}\!-\!N$ ---.

Column 2, line 72, that part of formula (IV) reading "$N\!\!\underset{}{\overset{\displaystyle\downarrow}{{}}}(\!=\!L$" should read --- $N\!\!\underset{}{\overset{\displaystyle\downarrow}{{}}}\!\!=\!L$ ---.

Column 4, line 1, after "2,3-b7" (first occurrence), ---pyridine nucleus, e.g.,--- should be inserted.

Column 4, line 3, that part of formula reading "/4,5chb7" should read ---/4,5-b7---.

Column 4, line 20, that part of formula reading "di/3" should read ---di/3---.

Column 4, line 30, that part of formula reading "3(4" should read --- 3-(4 ---.

Column 4, line 36, the letter "b" was not meant to be enclosed as it now reads, "/b7", but was meant to be bracketed ---/b_7---, and is not a separate structure but a continuation of the preceding and succeeding lines.

PO-1050
(5/69)

Page 2

UNITED STATES PATENT OFFICE
CERTIFICATE OF CORRECTION

Patent No. 3,619,194          Dated November 9, 1971

Inventor(s) Gary F. Mitchell

It is certified that error appears in the above-identified patent and that said Letters Patent are hereby corrected as shown below:

Column 4, line 37, that part of formula reading "3(2cH)" should read ---3(2H)---.

Column 4, line 38, that part of formula reading "$\underline{/}$3,2cha$\underline{/}$" should read ---$\underline{/}$3,2-a$\underline{/}$---.

Column 4, line 40, that part of formula reading "$\underline{/}$1,2-$\underline{/}$" should read ---$\underline{/}$1,2-a$\underline{/}$---.

Column 4, lines 41-42, that part of formula reading "2,4(3H,5H)" should read --- 2,4-(3H,5H) ---.

Column 5, line 33, "$-C(CH_3)$" should read --- $-C(CH_3)=$ ---.

Column 5, line 35, "1" should read ---(1)---.

Column 5, line 35, "2" should read ---(2)---.

Column 5, line 39, "3" should read ---(3)---.

Column 5, line 44, "$X^1$" should read ---$X^-$---.

Column 6, line 19, ";R,R and R" should read --- : R, $R^{11}$ and $R^{13}$ ---.

Column 6, lines 65-75, most of the bonds in formulas A-D are illegible.

Column 9, line 12, that part of formula reading "2(1-3-" should read --- 2(1-H)-pyridylidene)rhodanine and 3- ---.

Column 11, lines 18-19, "layers or between the support and a sensitive silver halide emulsion" should be deleted.

PO-1050
(5/69)

Page 3

UNITED STATES PATENT OFFICE
CERTIFICATE OF CORRECTION

Patent No. 3,619,194          Dated November 9, 1971

Inventor(s) Gary F. Mitchell

It is certified that error appears in the above-identified patent and that said Letters Patent are hereby corrected as shown below:

Column 14, line 36, that part of formula reading "4methoxyphenyl" should read --- 4-methoxyphenyl ---.

Column 14, line 73, that part of formula reading "1,2d" should read --- 1,2-d ---.

Column 16, line 11, that part of formula reading "2H" should read --- -2H ---.

Column 16, line 26, that part of formula reading "pyridothiocarbocyanine" should read ---pyridothiacarbocyanine---.

Column 16, line 30, "0105" should read ---.0105 ---.

Column 16, line 36, after "5.25;", ---N, 6.4--- should be inserted.

Column 17, line 12, "When" should read ---when---.

Column 17, line 68, "182-187°1/8" should read ---182-187°---.

Column 17, line 74, "p-tolyhydrazine" should read --- p-tolylhydrazine ---.

Column 17, line 75, after "0.08", ---mole) in--- should be inserted.

Column 18, line 1, "A suspension of 25.2" should be deleted.

Column 18, line 16, that part of formula reading "Bis" should read ---bis---.

PO-1050
(5/69)

Page 4

UNITED STATES PATENT OFFICE
CERTIFICATE OF CORRECTION

Patent No. 3,619,194          Dated November 9, 1971

Inventor(s) Gary F. Mitchell

It is certified that error appears in the above-identified patent and that said Letters Patent are hereby corrected as shown below:

Column 18, line 22, "206-210±1/8" should read ---206-210°---.

Column 18, line 26, that part of formula reading "bis-(4" should read ---bis(4---.

Column 18, line 60, "210-211±1/8" should read ---210-211°---.

Column 19, line 14, "poly(ethylene) (ethylene" should read ---poly(ethylene---.

Column 21, line 32, "geltino-" should read ---gelatino---.

In the Claims:

Column 21, line 59, that part of formula (I) reading "$\equiv\!ClR_3 \atop p-1$" should read --- $\equiv\!C\text{-}R_3 \atop p-1$ ---.

Column 21, line 66, "p 1" should read ---$R_1$---.

Column 22, line 4, "$X^1$" should read ---$X^-$---.

Column 22, line 16, that part of formula reading "$\equiv\!ClR_3 \atop p-1$" should read --- $\equiv\!C\text{-}R_3 \atop p-1$ ---.

Column 22, line 38, "$X^1$" should read ---$X^-$---.

Column 22, line 52, that part of formula reading "$-(L=L=)$" should read --- $=(L=L)-$ ---.

PO-1050
(5/69)

Page 5

UNITED STATES PATENT OFFICE
CERTIFICATE OF CORRECTION

Patent No. 3,619,194　　　　　　　　　Dated November 9, 1971

Inventor(s) Gary F. Mitchell

It is certified that error appears in the above-identified patent and that said Letters Patent are hereby corrected as shown below:

Column 23, line 13, "$X^1$" should read ---$X^-$---.

Column 23, line 29, that part of formula reading " $L\Rightarrow$ " should read --- $L\rightarrow$ ---.

Column 23, line 67, "$X^1$" should read ---$X^-$---.

Column 24, line 11, that part of formula reading "4'6,6'" should read ---4',6'---.

Column 24, line 25, that part of formula reading " $=\!=\!ClR_3 \atop p^-1$ " should read --- $=\!=\!C\text{-}R_3 \atop p\text{-}1$ ---.

Column 24, line 46, "$X^1$" should read ---$X^-$---.

Column 24, line 60, that part of formula reading " $\Rightarrow$L-C " should read --- $\rightarrow$L=C ---.

Column 24, lines 68-75, most of said formula as printed is illegible.

Column 25, line 23, "$X^1$" should read ---$X^-$---.

Column 25, line 31, that part of formula reading "totlyl-2pyridothiacarbocyanine" should read ---tolyl-2-pyridothiacarbocyaine---.

Column 25, line 50, that part of formula reading " $=\!=\!ClR_3 \atop p^-:$ " should read --- $=\!=\!C\text{-}R_3 \atop p\text{-}1$ ---.

Column 25, line 71, "$X^1$" should read ---$X^-$---.

PO-1050
(5/69)

Page 6

UNITED STATES PATENT OFFICE
CERTIFICATE OF CORRECTION

Patent No. 3,619,194    Dated November 9, 1971

Inventor(s) Gary F. Mitchell

It is certified that error appears in the above-identified patent and that said Letters Patent are hereby corrected as shown below:

Column 26, line 11, that part of formula reading: "L⇌L" should read --- L→L ---.

Column 26, line 48, "$X^1$" should read ---$X^-$---.

Column 26, line 63, that part of formula reading: "L⇌L" should read --- L→L ---.

Column 27, line 24, "$X^1$" should read ---$X^-$---.

Column 27, line 40, that part of formula reading: "L⇌L" should read --- L→L ---.

Column 27, last line, "$X^1$" should read ---$X^-$---.

Column 28, line 23, that part of formula reading: "L⇌L" should read --- L→L ---.

Column 28, line 60, "$X^1$" should read ---$X^-$---.

Column 29, line 11, that part of formula reading: "$R_8$" should read --- $R_8$ ---.

Column 29, line 14, that part of formula reading: "L⇌L" should read --- L→L ---.

Column 29, line 50, "$X^1$" should read ---$X^-$---.

Column 30, line 19, that part of formula reading: "L⇌L" should read --- L→L ---.

Column 30, line 55, "$X^1$" should read ---$X^-$---.

Column 30, line 56, "latest" should read ---latent---.

Signed and sealed this 9th day of January 1973.

(SEAL)
Attest:

EDWARD M. FLETCHER, JR.
Attesting Officer

ROBERT GOTTSCHALK
Commissioner of Patents